United States Patent [19]
Kurokawa et al.

[11] Patent Number: 5,289,257
[45] Date of Patent: Feb. 22, 1994

[54] SIGNAL PROCESSING APPARATUS FOR OPTICAL GYRO

[75] Inventors: Akihiro Kurokawa; Hiroshi Narise; Takafumi Hirano; Yoshiaki Hayakawa, all of Kamakura, Japan

[73] Assignee: Mitsubishi Precision Co., Ltd., Tokyo, Japan

[21] Appl. No.: 818,164

[22] Filed: Jan. 8, 1992

[30] Foreign Application Priority Data

May 17, 1991 [JP] Japan .................................. 3-113009
May 30, 1991 [JP] Japan .................................. 3-127639

[51] Int. Cl.$^5$ .............................................. G01C 19/64
[52] U.S. Cl. ........................................................ 356/350
[58] Field of Search ........................................ 356/350

[56] References Cited

U.S. PATENT DOCUMENTS 4,765,739 8/1988 Koizumi et al. ..................... 356/350
4,776,700 10/1988 Frigo .................................. 356/350
5,048,962 8/1991 Kurokawa et al. .................. 356/350

FOREIGN PATENT DOCUMENTS 0386739 9/1990 European Pat. Off. .
2-300623 12/1990 Japan .................................. 356/350

OTHER PUBLICATIONS

"OFS" 84 Conference Proceedings, Sep. 5-7, 1984, Stuttgart, RFA, K. B. Hn, et al.: "Fiber Optic Gyro with Digital Data Processing", pp. 251-258.

Search report of the corresponding French application No. 92 00199, searched on Jan. 29, 1993.
*Fiber-Optic Gryros: 19th Anniversary Conference* (1986), vol. 719, pp. 101-112, 1986 SPIE vol. 719.

*Primary Examiner*—Vincent P. McGraw
*Attorney, Agent, or Firm*—Merchant, Gould, Smith, Edell, Welter & Schmidt

[57] ABSTRACT

A signal processing apparatus for a phase modulation optical gyro includes: a circuit for taking components of frequencies fm, 2fm and 4fm from a photoelectric output signal proportional to an input rotation angular velocity and converting the components to analog signals of a frequency Δfm; a converter for converting the analog signals to a digital signal; a unit for forming a pair of digital signals shifted in phase by 90° from the digital signal, effecting a digital multiplication between the digital signal and the pair of digital signals to take DC components therefrom, and obtaining digital demodulation signals; a unit for discriminating a quadrant of presence of a phase difference of light based on Sagnac effect from the digital demodulation signals; a unit for computing a present phase modulation index from the digital demodulation signals; and a unit for outputting a digital signal proportional to the input rotation angular velocity based on the digital demodulation signals and each output of the discriminating unit and computing unit. As a result, it is possible to obtain a gyro output signal in accurate proportion to the input rotation angular velocity and also expand a maximum range of detection of the angular velocity, while improving characteristics of the optical gyro.

24 Claims, 21 Drawing Sheets

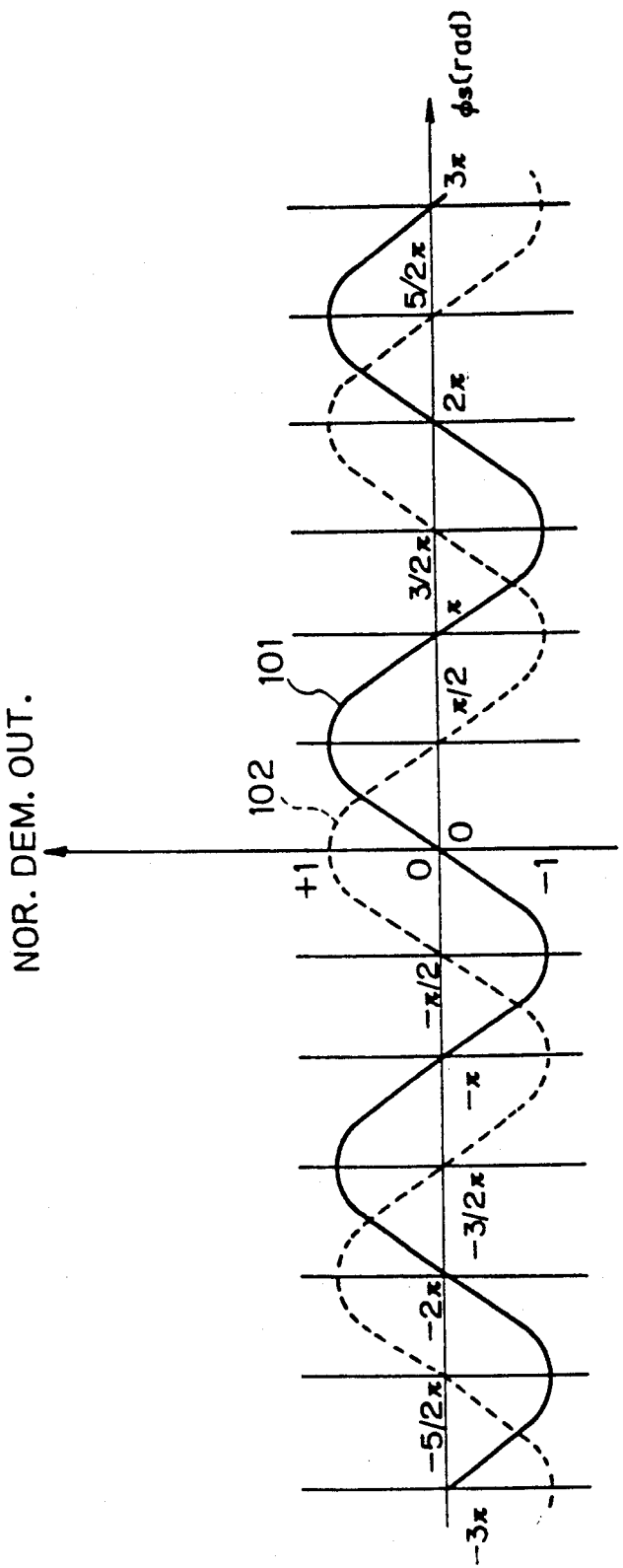

SIGNAL PROCESSING APPARATUS FOR OPTICAL GYRO

BACKGROUND OF THE INVENTION

1. Field of the Invention

The present invention relates to a technique of effecting a signal processing in an optical gyro. More particularly, it relates to a signal processing apparatus for an optical gyro in which light having a constant wavelength is propagated simultaneously clockwise and counterclockwise through an optical propagation path such as an optical fiber in cooperation with a rotation axis and receives a phase modulation and then a phase difference of the light based on Sagnac effect is detected to thereby obtain a signal proportional to an input rotation angular velocity or an angular increment signal.

2. Description of the Related Art

A typical fiber optical gyro using a phase modulation includes a propagation path of an optical fiber through which light is propagated simultaneously clockwise and counterclockwise, an optical system optically coupled to the optical propagation path and having a phase modulator for giving a phase modulation to the propagated light, and a signal processing apparatus for effecting an analog demodulation of a photoelectric output signal obtained from the optical system and thus driving the phase modulator. In a known example, the signal processing apparatus includes a number of analog circuits, e.g., an analog multiplier, a low pass filter, a band pass filter, an oscillator, and the like, which respond to the photoelectric output signal and generate a drive signal for the phase modulator.

As described later in detail, however, the driving technique employing such an analog demodulation has a number of drawbacks. For example, where offset voltages occurring in each analog circuit fluctuate, a bias stability of the gyro is lowered. Also, even if the offset voltages are zero, the gyro output or angular increment output is proportional to sin $\phi$ s (Note, $\phi$ s is a phase difference of light based on Sagnac effect) and thus a problem occurs in that a linearity of the gyro for the input rotation angular velocity is not good Also, a drawback occurs in that, when a navigation object loaded with the fiber optical gyro is in movement, a detectable maximum angular velocity is limited to a narrow range. Furthermore, another problem occurs in that the linearity and scale factor stability of the gyro output are easily deteriorated due to a fluctuation in a quantity of incoherent light of a light beam in the optical system, a fluctuation in a phase modulation index of the phase modulator, or the like.

Note, the problems in the prior art will be explained later in detail in contrast with the preferred embodiments of the present invention.

SUMMARY OF THE INVENTION

A main object of the present invention is to provide a signal processing apparatus for an optical gyro which can obtain a gyro output signal or an angular increment output signal in accurate proportion to an input rotation angular velocity.

Another object of the present invention is to expand a maximum range of detection of the input rotation angular velocity of the optical gyro.

Still another object of the present invention is to minimize a bias fluctuation in the optical gyro and improve a linearity and scale factor stability thereof.

According to one aspect of the present invention, there is provided an apparatus for effecting a signal processing for an optical gyro in which light is propagated simultaneously clockwise and counterclockwise through an optical propagation path in cooperation with a rotation axis and receives a phase modulation and then a phase difference of the light based on Sagnac effect is detected to obtain a photoelectric output signal proportional to an input rotation angular velocity, the apparatus including: a frequency mixing circuit, responsive to analog and digital reference signals in synchronization in frequency and phase with a drive signal for the phase modulation, for taking signal components of the same frequency fm as, a frequency 2fm twice, and a frequency 4fm four times that of the drive signal from the photoelectric output signal and converting the signal components to a signal of a frequency $\Delta$fm, respectively, to thereby output first, second and third analog signals, respectively, and for converting the analog reference signal to a signal of the frequency $\Delta$fm to thereby output a fourth analog signal; an analog/digital converter, responsive to a second digital signal in synchronization in phase with the fourth analog signal, for converting the first to third analog signals to a first digital signal; a digital demodulating unit, operatively connected to the frequency mixing circuit and the analog/digital converter, for outputting the second digital signal, generating a third digital signal in synchronization in phase with the fourth analog signal, forming fourth and fifth digital signals in synchronization in phase with the third digital signal and shifted in phase by 90° from each other, effecting a digital multiplication between the first digital signal and the fourth and fifth digital signals to take direct current components from a result of the multiplication, and thus outputting sixth and seventh digital signals; a quadrant discriminating unit, responsive to the sixth and seventh digital signals, for discriminating a quadrant of presence of the phase difference of the light based on Sagnac effect from signs of signal components corresponding to the frequency fm of the photoelectric output signal and the frequency 2fm or 4fm thereof, and outputting eighth and ninth digital signals; a phase modulation index computing unit, responsive to the sixth and seventh digital signals, for outputting a tenth digital signal corresponding to a present phase modulation index from a ratio of each amplitude of the signal components corresponding to the frequencies 2fm and 4fm of the photoelectric output signal; and an angular velocity computing unit, responsive to the sixth to tenth digital signals, for outputting an eleventh digital signal proportional to the input rotation angular velocity.

Also, the apparatus may further include a digital synthesizing unit, responsive to the eleventh digital signal, for outputting a fifteenth digital signal indicating a polarity of the eleventh digital signal, and a sixteenth digital signal indicating the number of pulses corresponding to an angular increment proportional to the input rotation angular velocity.

According to another aspect of the present invention, there is provided an apparatus for effecting a signal processing for an optical gyro in which light is propagated simultaneously clockwise and counterclockwise through an optical propagation path in cooperation with a rotation axis and receives a phase modulation and then a phase difference of the light based on Sagnac effect is detected to obtain a photoelectric output signal proportional to an input rotation angular velocity, the apparatus including: a frequency mixing circuit, responsive to analog and digital reference signals in synchronization in frequency and phase with a drive signal for the phase modulation, for taking signal components of the same frequency fm as, a frequency 2fm twice, and a frequency 4fm four times that of the drive signal from the photoelectric output signal and converting the respective signal components to a signal of a frequency $\Delta$fm, a signal of a frequency 2$\Delta$fm and a signal of a frequency 4$\Delta$fm, respectively, to thereby output first, second and third analog signals, respectively, and for converting the analog reference signal to a signal of the frequency $\Delta$fm to thereby output a fourth analog signal; an analog/digital converter, responsive to a second digital signal in synchronization in phase with the fourth analog signal, for converting the first to third analog signals to a first digital signal; a digital demodulating unit, operatively connected to the frequency mixing circuit and the analog/digital converter, for outputting the second digital signal, generating a third digital signal in synchronization in phase with the fourth analog signal, forming fourth and fifth digital signals in synchronization in phase with the third digital signal and shifted in phase by 90° from each other, effecting a digital multiplication between the first digital signal and the fourth and fifth digital signals to take direct current components from a result of the multiplication, and thus outputting sixth and seventh digital signals; a polarity discriminating unit, responsive to the sixth and seventh digital signals, for discriminating a polarity of the input rotation angular velocity to thereby output an eighth digital signal; a phase modulation index computing unit, responsive to the sixth and seventh digital signals, for outputting a ninth digital signal for keeping constant a ratio of each amplitude of the signal components corresponding to the frequencies 2fm and 4fm of the photoelectric output signal, and outputting a tenth digital signal corresponding to a present phase modulation index; and an angular velocity computing unit, responsive to the sixth, seventh, eighth and tenth digital signals, for outputting an eleventh digital signal proportional to the input rotation angular velocity.

Also, according to still another aspect of the present invention, there is provided an apparatus for effecting a signal processing for an optical gyro in which light is propagated simultaneously clockwise and counterclockwise through an optical propagation path in cooperation with a rotation axis and receives a phase modulation and then a phase difference of the light based on Sagnac effect is detected to obtain a photoelectric output signal proportional to an input rotation angular velocity, the apparatus including: a frequency mixing circuit, responsive to digital reference signals in synchronization with a drive signal for the phase modulation, for taking signal components of the same frequency fm as, a frequency 2fm twice, and a frequency 4fm four times that of the drive signal from the photoelectric output signal and converting the respective signal components to a signal of a frequency $\Delta$fm$_1$, a signal of a frequency $\Delta$fm$_2$ and a signal of a frequency $\Delta$fm$_3$, respectively, to thereby output first, second and third analog signals, respectively, and for converting fifth, seventh and ninth analog reference signals in synchronization in phase with the drive signal and having frequencies fm, 2fm and 4fm, respectively, to a signal of the frequency fm$_1$, a signal of the frequency $\Delta$fm$_2$ and a signal of the frequency $\Delta$fm$_3$, respectively, to thereby output fourth, sixth and eighth analog signals, respectively; an analog/digital converting circuit, responsive to second, seventh and twelfth digital signals in synchronization with the fourth, sixth and eighth analog signals, respectively, for converting the first, second and third analog signals to first, sixth and eleventh digital signals, respectively; a digital demodulating unit, operatively connected to the frequency mixing circuit and the analog/digital converting circuit, for outputting the second, seventh and twelfth digital signals, generating third, eighth and thirteenth digital signals in synchronization with the fourth, sixth and eighth analog signals, respectively, forming fourth and fifth digital signals in synchronization with the third digital signal and shifted in phase by 90° from each other, ninth and tenth digital signals in synchronization with the eighth digital signal and shifted in phase by 90° from each other, and fourteenth and fifteenth digital signals in synchronization with the thirteenth digital signal and shifted in phase by 90° from each other, effecting digital multiplications between the first digital signal and the fourth and fifth digital signals, between the sixth digital signal and the ninth and tenth digital signals, and between the eleventh digital signal and the fourteenth and fifteenth digital signals, and taking direct current components from results of the respective multiplication to thus output a sixteenth digital signal; a polarity discriminating unit, responsive to the sixteenth digital signal, for discriminating a polarity of the input rotation angular velocity to thereby output a seventeenth digital signal; a phase modulation index computing unit, responsive to the sixteenth digital signal, for outputting an eighteenth digital signal for keeping constant a ratio of each amplitude of the signal components corresponding to the frequencies 2fm and 4fm of the photoelectric output signal, and outputting a ninteenth digital signal corresponding to a present phase modulation index; and an angular velocity computing unit, responsive to the sixteenth, seventeenth and ninteenth digital signals, for outputting a twentieth digital signal proportional to the input rotation angular velocity.

BRIEF DESCRIPTION OF THE DRAWINGS

Other objects and features of the present invention will be described hereinafter in detail by way of preferred embodiments with reference to the accompanying drawings, in which:

FIG. 3 is a waveform diagram showing the normalized demodulated outputs (26,27) produced in the apparatus of FIG. 2;

DESCRIPTION OF THE PREFERRED EMBODIMENTS

Throughout the description, identical references used in connection with the drawings indicate like constituent elements and thus the repetition of explanation thereof is omitted.

First, a first embodiment of the present invention will be explained with reference to FIGS. 1 to 7.

Before explaining the first embodiment, the related prior art will be explained with reference to FIG. 1.

Figure 1:
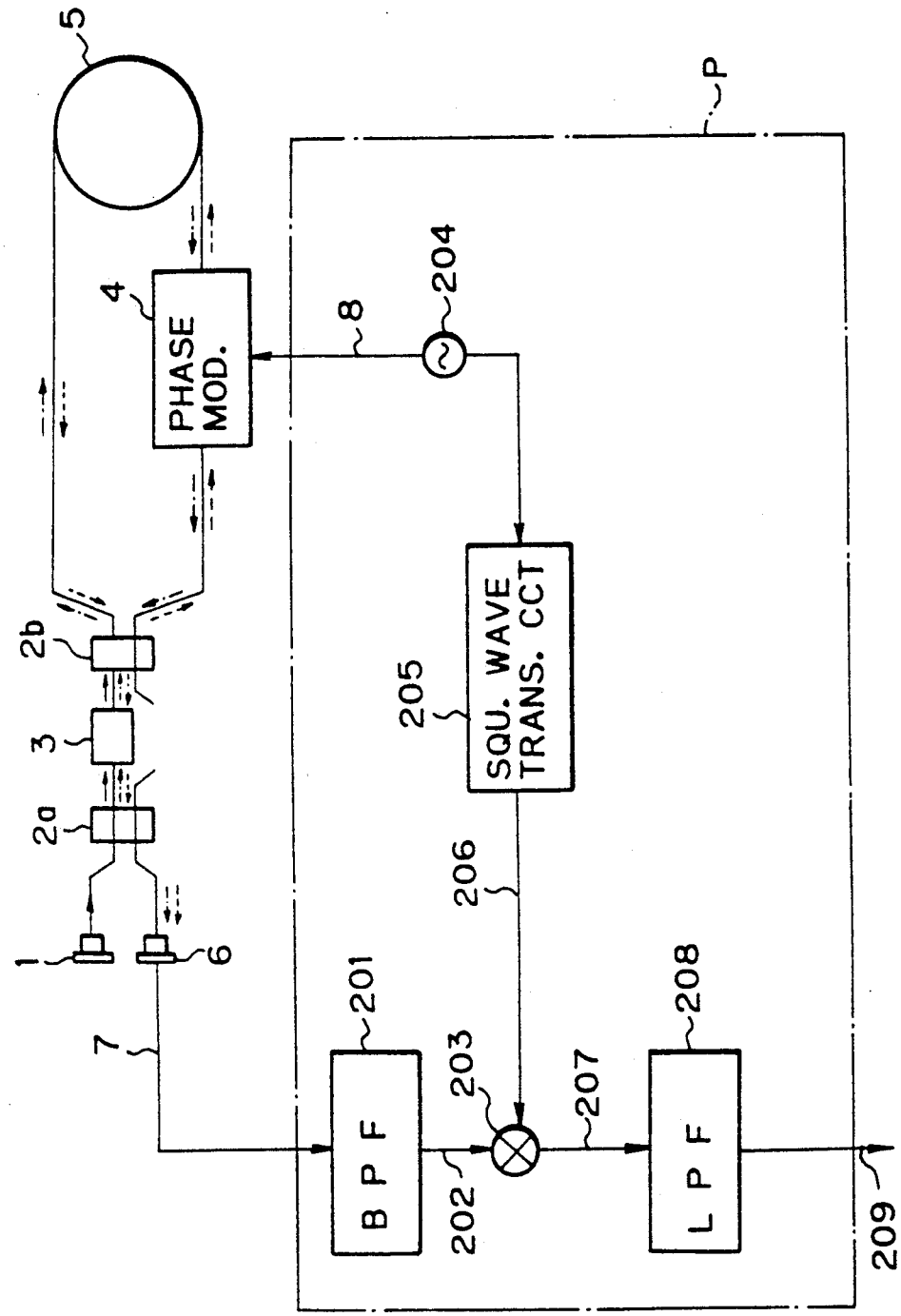
FIG. 1 is a block diagram illustrating, partially schematically, a constitution of a prior art fiber optical gyro using a phase modulation.

FIG. 1 illustrates, partially schematically, a constitution of a prior art fiber optical gyro using a phase modulation.

In the illustration, reference 1 denotes a light source; references 2a, 2b each an optical distributor and coupler; reference 3 a polarizer; reference 4 a phase modulator; reference 5 an optical propagation path formed by a single mode optical fiber wound perpendicularly with respect to the rotation axis and conserving the plane of polarization; reference 6 a photoelectric transducing circuit; reference 7 a photoelectric output signal; reference 8 a phase modulator drive signal; reference 201 a band pass filter; reference 202 an output of the band pass filter; reference 203 an analog multiplier; reference 204 an oscillator; reference 205 a square wave transducing circuit; reference 206 an output of the square wave transducing circuit; reference 207 an output of the analog multiplier 203; reference 208 a low pass filter; and reference 209 a gyro output. Also, reference P denotes a signal processing circuit.

In the constitution of FIG. 1, a first light beam emitted from the light source 1 is received at the first optical distributor and coupler 2a and then split into second and third light beams. The second light beam is propagated in the direction shown by an arrow mark of a solid line and received at the polarizer 3. A portion of the second light beam, i.e., only the polarized component, is transmitted through the polarizer 3 and received at the second optical distributor and coupler 2b. The second light beam incident on the second optical distributor and coupler 2b is split into fourth and fifth light beams.

The fourth light beam is propagated in the direction shown by an arrow mark of a broken line and received at the phase modulator 4 to be given a phase modulation of $\Phi m \sin(\omega mt)$. Note, $\Phi m$ indicates a maximum phase shift and $\omega m$ indicates a drive angular frequency for the phase modulator 4. The phase-modulated fourth light beam is propagated counterclockwise through the optical propagation path 5 and then received at the second optical distributor and coupler 2b.

On the other hand, the fifth light beam is propagated in the direction shown by an arrow mark of a dot-and-dash line, propagated clockwise through the optical propagation path 5 and then received at the phase modulator 4 to be given the phase modulation of $\Phi m \sin(\omega mt)$. After the phase modulation, the fifth light beam is received at the second optical distributor and coupler 2b.

The fourth and fifth light beams incident on the second optical distributor and coupler 2b are coupled to produce a sixth light beam. The sixth light beam is received at the polarizer 3 and a portion thereof, i.e., only the polarized component, is transmitted through the polarizer 3. The polarized six light beam is received at the first optical distributor and coupler 2a and split into seventh and eighth light beams. The eighth light beam is received at the photoelectric transducing circuit 6 to produce the photoelectric output signal 7.

The photoelectric output signal 7 is input to the band pass filter 201, which transmits only a component of the same angular frequency $\omega m$ as the angular frequency of the phase modulator drive signal 8. Also, the phase modulator drive signal 8 output from the oscillator 204 is input to the square wave transducing circuit 205 and transduced into a square wave in synchronization therewith in frequency and phase. The output signal 202 of the band pass filter 201 and the output signal 206 of the square wave transducing circuit 205 are input to the analog multiplier 203. The output signal 207 of the analog multiplier 203 is input to the low pass filter 208 and only a direct current (DC) component thereof is transmitted to thereby produce the gyro output signal 209. The gyro output signal 209 is expressed by the following formula:

$$V_0 \propto -(2/\pi)P_0 \sin\phi s \cdot J_1(\eta)\sin\psi_0 + U_1 + U_2 \quad (1)$$

Note, $V_0$ indicates the gyro output signal; $P_0$ a quantity of incoherent light of the eighth light beam; $\phi$ s the phase difference of light based on Sagnac effect ($=4\pi RL\Omega/\lambda C$); R a radius of the optical propagation path; L a length of the optical fiber; $\Omega$ an input rotation angular velocity in the fiber optical gyro; $\lambda$ a wavelength of light in a vacuum atmosphere; C a speed of light in the vacuum atmosphere; $J_1$ a first-order Bessel function; $\eta$ a phase modulation index; $\psi_0$ a phase difference between the output signal 202 of the band pass filter 201 and the output signal 206 of the square wave transducing circuit 205; $U_1$ an offset voltage of the analog multiplier 203; and $U_2$ an offset voltage of the low pass filter 208.

In the above prior art signal processing circuit P, the gyro output 209 (signal $V_0$) is proportional to sin $\phi$ s even if the offset voltages $U_1$ and $U_2$ are zero (0) This results in a problem in that a linearity of the gyro for the input rotation angular velocity $\Omega$ is not good. Also, a drawback occurs in that, when a navigation object loaded with the fiber optical gyro is in movement, a detectable maximum angular velocity is limited to the range corresponding to $\pm\pi/2$ [rad] with respect to the phase difference $\phi$ s of light based on Sagnac effect.

Also, a problem occurs in that a linearity and scale factor stability of the gyro output 209 are easily deteriorated due to a fluctuation in the quantity $P_0$ of incoherent light of the eighth light beam incident on the photoelectric transducing circuit, a fluctuation in the phase modulation index $\eta$ of the phase modulator 4 and a fluctuation in the phase difference $\psi_0$.

Furthermore, another problem occurs in that, even if the input rotation angular velocity is zero (i.e., $\phi s=0$), a bias stability of the gyro is easily lowered due to fluctuations in the offset voltages $U_1$ and $U_2$.

Figure 2:
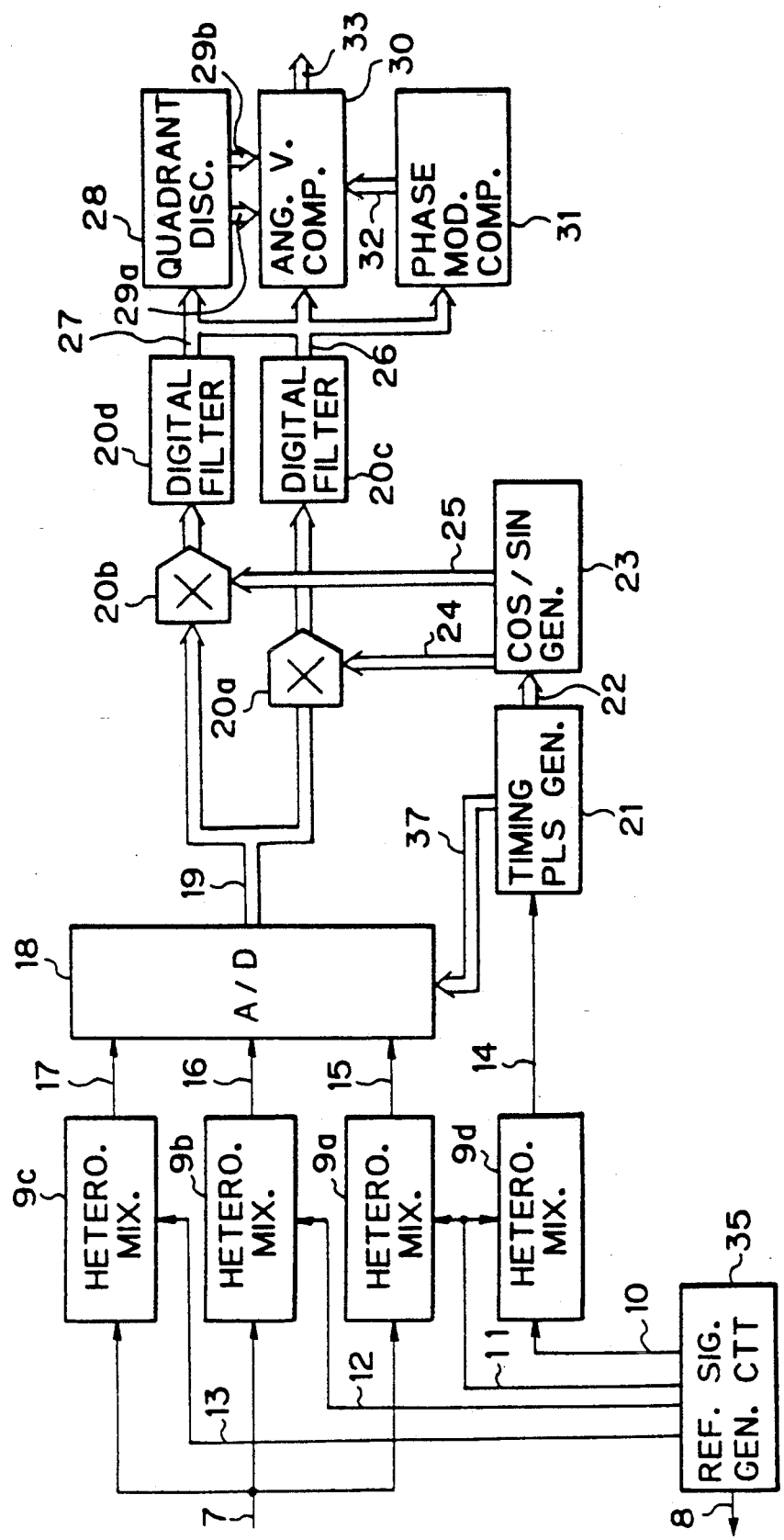
FIG. 2 is a block diagram illustrating a constitution of the signal processing apparatus for an optical gyro as a first embodiment of the present invention.

FIG. 2 illustrates a constitution of the signal processing apparatus for an optical gyro as the first embodiment of the present invention.

The illustrated signal processing apparatus can be applied by substituting it for, e.g., the signal processing circuit P of the fiber optical gyro shown in FIG. 1. The apparatus includes first to fourth heterodyne mixers 9a, 9b, 9c and 9d, an analog/digital (A/D) converter 18, a timing pulse generating unit 21, a cosine/sine signal (cos/sin) generating unit 23, first and second digital multipliers 20a, 20b, first and second digital filters 20c, 20d, a quadrant discriminating unit 28, an angular velocity computing unit 30, a phase modulation index computing unit 31 and a reference signal generating circuit 35.

The digital multipliers 20a, 20b, the digital filters 20c, 20d, the timing pulse generating unit 21 and the cos/sin generating unit 23 execute a digital demodulation of the output of the A/D converter 18 in cooperation with one another (digital demodulating unit). Also, the digital demodulating unit, the quadrant discriminating unit 28, the angular velocity computing unit 30 and the phase modulation index computing unit 31 execute the respective operations based on software processing and, preferably, are constituted in the form of a one chip digital signal processor.

The operation of each constituent element will now be explained below.

First, the reference signal generating circuit 35 outputs a phase modulator drive signal 8 (sixth analog signal), and generates a fifth analog signal 10, a twelfth digital signal 11, a thirteenth digital signal 12 and a fourteenth digital signal 13, respectively, in synchronization in frequency and phase with the sixth analog signal 8. The respective signals 10, 11, 12 and 13 are fed to the fourth heterodyne mixer 9d, the first and fourth heterodyne mixers 9a, 9d, the second heterodyne mixer 9b, and the third heterodyne mixer 9c, respectively. Also, the phase-modulated photoelectric output signal 7 is input to the first to third heterodyne mixers 9a~9c.

The first heterodyne mixer 9a responds to the twelfth digital signal 11, takes a signal component of the same frequency as a frequency fm of the phase modulator drive signal 8 from the photoelectric output signal 7, converts the signal component to a signal of a frequency $\Delta$fm, and outputs a first analog signal 15, which is expressed by the following formula:

<first analog signal 15>;

$$V_1 \propto 2P_0 \sin\phi s \cdot J_1(\eta) \cdot \sin(\Delta\omega_m t + \psi_1) \quad (2)$$

Note, $\Delta\omega_m$ indicates a change in the phase modulator drive angular frequency ($=2\pi\Delta$fm), and $\psi_1$ indicates a phase difference between the signal component of the frequency fm taken out of the photoelectric output signal 7 and the twelfth digital signal 11 having a frequency of (fm+$\Delta$fm).

The second heterodyne mixer 9b responds to the thirteenth digital signal 12, takes a signal component of a frequency 2fm from the photoelectric output signal 7, converts the signal component to a signal of the frequency $\Delta$fm, and outputs a second analog signal 16, which is expressed by the following formula:

<second analog signal 16>;

$$V_2 \propto 2P_0 \cos\phi s \cdot J_2(\eta) \cdot \sin(\Delta\omega_m t + \psi_2) \quad (3)$$

Note, $\psi_2$ indicates a phase difference between the signal component of the frequency 2fm taken out of the photoelectric output signal 7 and the thirteenth digital signal 12 having a frequency of (2fm+$\Delta$fm).

The third heterodyne mixer 9c responds to the fourteenth digital signal 13, takes a signal component of a frequency 4fm from the photoelectric output signal 7, converts the signal component to a signal of the frequency $\Delta$fm, and outputs a third analog signal 17, which is expressed by the following formula:

<third analog signal 17>;

$$V_3 \propto 2P_0 \cos\phi s \cdot J_4(\eta) \cdot \sin(\Delta\omega_m t + \psi_3) \quad (4)$$

Note, $\psi_3$ indicates a phase difference between the signal component of the frequency 4fm taken out of the photoelectric output signal 7 and the fourteenth digital signal 13 having a frequency of (4fm+$\Delta$fm).

The first to third analog signals 15, 16 and 17 are input to the A/D converter 18 to be converted to a first digital signal 19. The first digital signal 19 is expressed, for example, by binary number.

The fourth heterodyne mixer 9d responds to the twelfth digital signal 11, converts the fifth analog signal 10 to a signal of the frequency $\Delta$fm, and outputs a fourth analog signal 14, which is expressed by the following formula:

<fourth analog signal 14>;

$$V_4 \propto \sin(\Delta\omega_m t + \psi_{REF}) \quad (5)$$

Note, $\psi_{REF}$ indicates a phase difference between the fifth analog signal 10 and the twelfth digital signal 11.

The fourth analog signal 14 is input to the timing pulse generating unit 21 and converted to second and third digital signals 37, 22 in synchronization in phase therewith. The second digital signal 37 is input to the A/D converter 18. The A/D converter 18 converts the first to third analog signals 15, 16 and 17 to the first digital signal 19 in synchronization with the second digital signal 37. On the other hand, the third digital signal 22 is input to the cos/sin generating unit 23. The cos/sin generating unit 23 divides one cycle of the third digital signal 22 into time slots at every predetermined time and outputs values of cosine and sine, which are generated at timings corresponding to the time slots and shifted in phase by 90° from each other. The values of cosine and sine are output as fourth and fifth digital signals 24 and 25, respectively, which are expressed by the following formulas:

<fourth digital signal 24>;
$$V_{REF, cos} \propto \cos(\Delta\omega_m t + \psi_{REF}) \quad (6)$$

<fifth digital signal 25>;
$$V_{REF, sin} \propto \sin(\Delta\omega_m t + \psi_{REF}) \quad (7)$$

The fourth digital signal 24 together with the first digital signal 19 is input to the first digital multiplier 20a, where the multiplication of both signals is digitally carried out. The first digital filter 20c takes a DC component from a result of the multiplication and thus outputs a sixth digital signal 26. Respective signals corresponding to the first to third analog signals 15, 16 and 17 of the sixth digital signal 26 are expressed by the following formulas:

<sixth digital signal 26 corr. to signal 15>;
$$V_{1, cos} \propto P_0 \sin\phi s \cdot J_1(\eta) \cdot \sin(\psi_1') \quad (8)$$

<sixth digital signal 26 corr. to signal 16>;
$$V_{2, cos} \propto P_0 \cos\phi s \cdot J_2(\eta) \cdot \sin(\psi_2') \quad (9)$$

<sixth digital signal 26 corr. to signal 17>;
$$V_{3, cos} \propto P_0 \cos\phi s \cdot J_4(\eta) \cdot \sin(\psi_3') \quad (10)$$

where
$$\psi_1' = \psi_1 - \psi_{REF}$$
$$\psi_2' = \psi_2 - \psi_{REF}$$
$$\psi_3' = \psi_3 - \psi_{REF}$$

On the other hand, the fifth digital signal 25 together with the first digital signal 19 is input to the second digital multiplier 20b, where the multiplication of both signals is digitally carried out. The second digital filter 20d takes a DC component from a result of the multiplication and thus outputs a seventh digital signal 27. Respective signals corresponding to the first to third analog signals 15, 16 and 17 of the seventh digital signal 27 are expressed by the following formulas:

<seventh digital signal 27 corr. to signal 15>;
$$V_{1, sin} \propto P_0 \sin\phi s \cdot J_1(\eta) \cdot \cos(\psi_1') \quad (11)$$

<seventh digital signal 27 corr. to signal 16>;
$$V_{2, sin} \propto P_0 \cos\phi s \cdot J_2(\eta) \cdot \cos(\psi_2') \quad (12)$$

<seventh digital signal 27 corr. to signal 17>;
$$V_{3, sin} \propto P_0 \cos\phi s \cdot J_4(\eta) \cdot \cos(\psi_3') \quad (13)$$

As explained above, since the multiplication and filtering are digitally carried out (i.e., digital demodulation), it is possible to remove a disadvantage in that an offset voltage occurring in analog ICs is overlapped on a demodulated signal as seen in a prior art signal processing (i.e., analog demodulation).

The sixth and seventh digital signals 26, 27 expressed by the formulas (8) to (13) are input to the quadrant discriminating unit 28. The quadrant discriminating unit 28 executes the logic discrimination below based on signs of the components $V_{1,cos}$ and $V_{2,cos}$ or $V_{3,cos}$ of the sixth digital signal 26, and signs of the components $V_{1,sin}$ and $V_{2,sin}$ or $V_{3,sin}$ of the seventh digital signal 27.

Note, the components $V_{1,cos}$ and $V_{1,sin}$ correspond to a normalized demodulated output 101 shown by a solid line in FIG. 3 and the components $V_{2,cos}$, $V_{3,cos}$, $V_{2,sin}$ and $V_{3,sin}$ correspond to a normalized demodulated output 102 shown by a broken line therein.

Referring to FIG. 3, signs of each normalized demodulated output 101, 102 are changed as shown in Table (a) below with respect to each range of the phase difference $\phi s$ based on Sagnac effect.

TABLE (a)

| $\phi$ s[rad] | sign of signal (101) | sign of signal (102) | mark of quadrant (M) |
|---|---|---|---|
| : | : | : | : |
| $-4\pi \sim -7\pi/2$ | Positive | Positive | 2 |
| $-7\pi/2 \sim -3\pi$ | Positive | Negative | 3 |
| $-3\pi \sim -5\pi/2$ | Negative | Negative | 0 |
| $-5\pi/2 \sim -2\pi$ | Negative | Positive | 1 |
| $-2\pi \sim -3\pi/2$ | Positive | Positive | 2 |
| $-3\pi/2 \sim -\pi$ | Positive | Negative | 3 |
| $-\pi \sim -\pi/2$ | Negative | Negative | 0 |
| $-\pi/2 \sim 0$ | Negative | Positive | 1 |
| $0 \sim \pi/2$ | Positive | Positive | 2 |
| $\pi/2 \sim \pi$ | Positive | Negative | 3 |
| $\pi \sim 3\pi/2$ | Negative | Negative | 0 |
| $3\pi/2 \sim 2\pi$ | Negative | Positive | 1 |
| $2\pi \sim 5\pi/2$ | Positive | Positive | 2 |
| $5\pi/2 \sim 3\pi$ | Positive | Negative | 3 |
| $3\pi \sim 7\pi/2$ | Negative | Negative | 0 |
| $7\pi/2 \sim 4\pi$ | Negative | Positive | 1 |
| : | : | : | : |

Based on the logic discrimination shown in Table (a), the quadrant of presence of the phase difference $\phi$ s based on Sagnac effect is first determined in a range of $\pm \pi$[rad] (range "A" of quadrant). In this case, the mark "M" of quadrant in the range "A" of quadrant of the phase difference $\phi$ s is classified into four kinds ("0", "1", "2" and "3") according to the combination of each sign of the normalized demodulated outputs 101, 102.

As shown in Table (a), the mark "M" of quadrant in a given range of the phase difference $\phi$ s is different from that in a range adjacent to the given range. By utilizing this feature, the quadrant discriminating unit 28 can execute the logic discrimination as follows:

① When the mark "M" of quadrant is changed from "3" to "0", the unit 28 judges that the quadrant of presence of the phase difference $\phi$ s lies in a range of quadrant which corresponds to an addition of $2\pi$[rad] to a previous range of presence of the mark "M" of quadrant.

② When the mark "M" of quadrant is changed from "0" to "3", the unit 28 judges that the quadrant of presence of the phase difference $\phi$ s lies in a range of quadrant which corresponds to a subtraction of $2\pi$ [rad] from the previous range of presence of the mark "M" of quadrant.

Figure 4A:
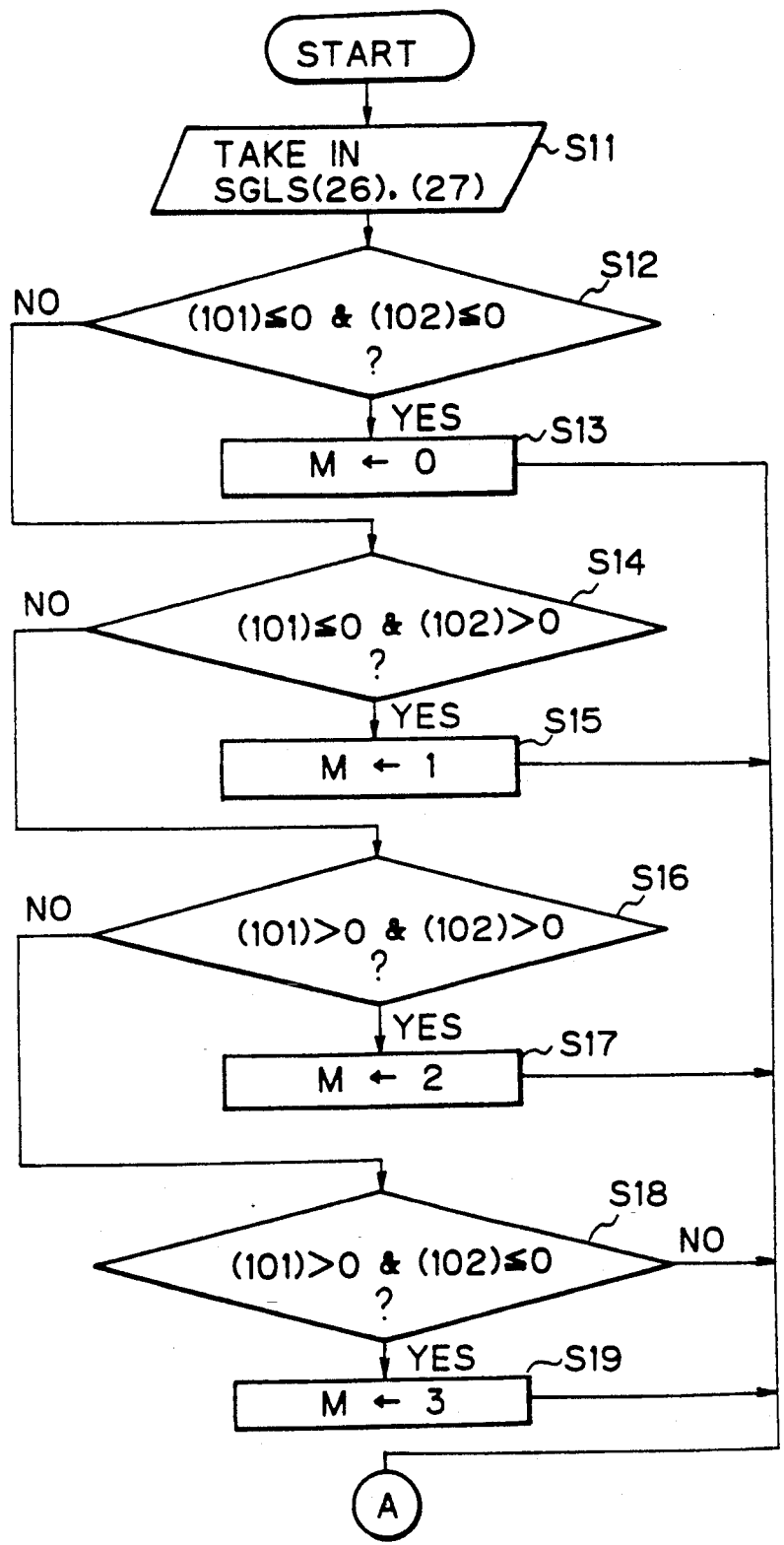
FIGS. 4A and 4B are flow charts representing an example of the processing executed by the quadrant discriminating unit shown in FIG. 2.
Figure 4B:
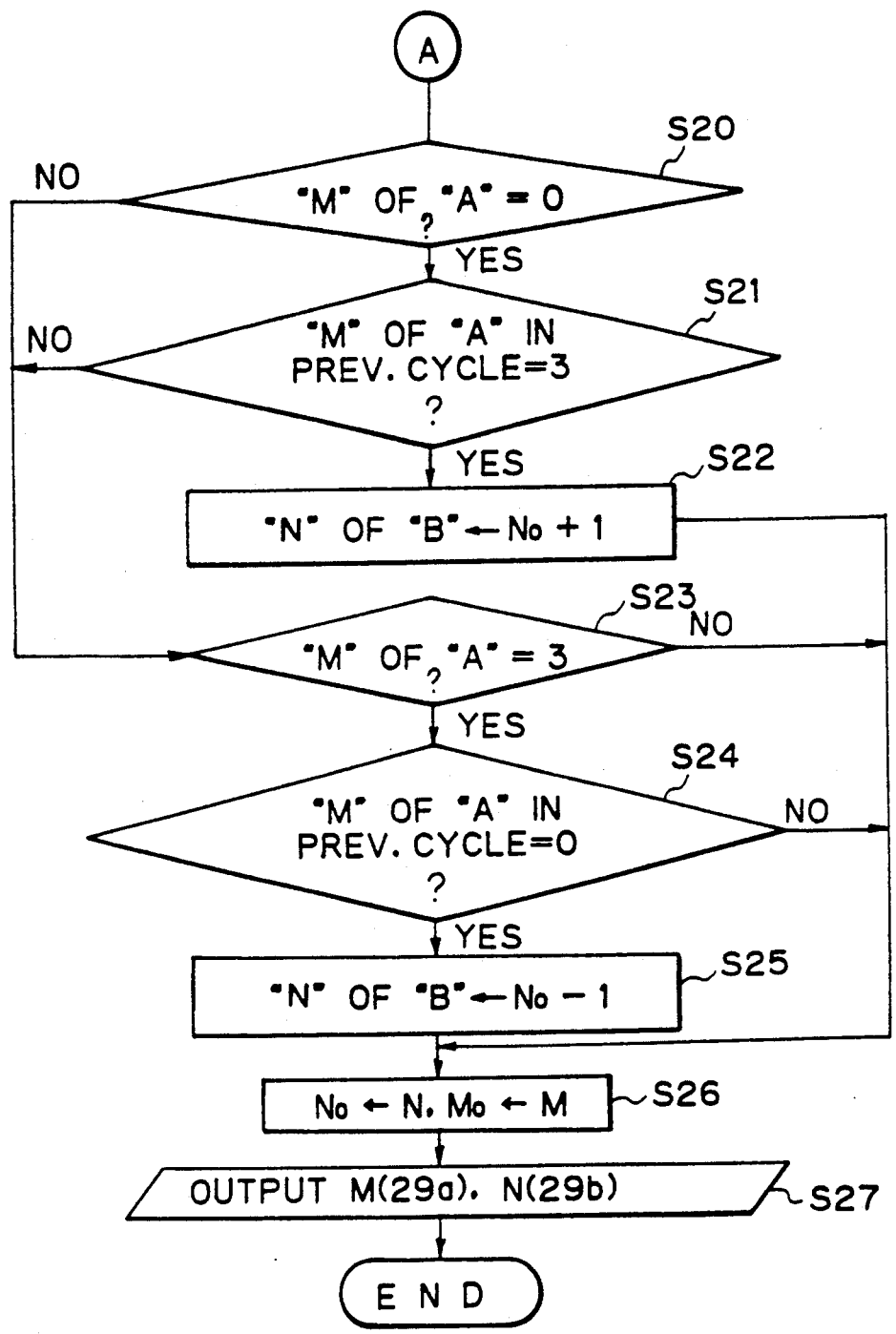

FIGS. 4A and 4B represent an example of the processing executed by the quadrant discriminating unit 28. Note, the example shows the case in which the quadrant discrimination is carried out with respect to the range "A" of quadrant ($-\pi$[rad] $\sim +\pi$[rad]) of the phase difference $\phi$ s.

First, at step S11, the unit 28 takes in the sixth and seventh digital signals 26, 27 (i.e., normalized demodulated outputs 101, 102). At steps S12 to S19, a logic discrimination of the mark "M" of quadrant is carried out according to the combination of each sign of the normalized demodulated outputs 101, 102.

At step S20, the unit 28 judges whether the mark "M" of quadrant in the range "A" of quadrant is equal to zero (YES) or not (NO). If the result of judgement indicates YES, the control proceeds to step S21, and if the result of judgement indicates NO, the control proceeds to step S23. At step S21, the unit 28 judges whether a mark "$M_0$" of quadrant in the range "A" of quadrant in the previous computation cycle is equal to three [Note, "$M_0$" is equal to two in the initial state] (YES) or not (NO). If the result of judgement indicates YES, the control proceeds to step S22, and if the result of judgement indicates NO, the control proceeds to step S23.

Where the result of judgement at step S20 indicates YES and the result of judgement at step S21 indicates YES, the quadrant discriminating unit 28 executes the processing corresponding to the case of the aforementioned ①. Accordingly, at step S22, "1" is added to a mark "$N_0$" of quadrant [Note, "$N_0$" is equal to zero in the initial state] in a range "B" of quadrant before the change in the mark "M" of quadrant, and the addition is set as the mark "N" of quadrant in the range "B" of quadrant. Namely, the unit 28 judges that the quadrant of presence of the phase difference $\phi$ s lies in the range of quadrant which corresponds to an addition of $2\pi$ [rad] to the previous range of presence of the mark "M" of quadrant.

After the completion of the processing at step S22, the control proceeds to step S26, where the marks "M" and "N" of quadrant are set as "M°" and "N°", respectively. At the next step S27, the unit 28 outputs the results of the quadrant discrimination (marks "M" "N" of quadrant) as signals 29a, 29b. After this processing, the control comes to an "END".

On the other hand, at step S23, the unit 28 judges whether the mark "M" of quadrant in the range "A" of quadrant is equal to three (YES) or not (NO). If the result of judgement indicates YES, the control proceeds to step S24, and if the result of judgement indicates NO, the control proceeds to step S26. At step S24, the unit 28 judges whether the mark "$M_0$" of quadrant in the range "A" of quadrant in the previous computation cycle is equal to zero [Note, "$M_0$" is equal to two in the initial state] (YES) or not (NO). If the result of judgement indicates YES, the control proceeds to step S25, and if the result of judgement indicates NO, the control proceeds to step S26.

Where the result of judgement at step S23 indicates YES and the result of judgement at step S24 indicates YES, the quadrant discriminating unit 28 executes the processing corresponding to the case of the aforementioned ②. Accordingly, at step S25, "1" is subtracted from the mark "N°" of quadrant [Note, "$N_0$" is equal to zero in the initial state] in the range "B" of quadrant before the change in the mark "M" of quadrant, and the result of subtraction is set as the mark "N" of quadrant in the range "B" of quadrant. Namely, the unit 28 judges that the quadrant of presence of the phase difference $\phi$ s lies in the range of quadrant which corresponds to a subtraction of $2\pi$ [rad] from the previous range of presence of the mark "M" of quadrant.

After the completion of the processing at step S25, the control proceeds to step S26 and thus the above processing is repeated.

The results of the quadrant discrimination based on the above logic discrimination processing are shown in Table (b) below.

TABLE (b)

| $\phi$ s[rad] | mark of quadrant (M) | mark of quadrant (N) |
|---|---|---|
| ⋮ | ⋮ | ⋮ |
| $-4\pi \sim -7\pi/2$ | 2 | $-2$ |
| $-7\pi/2 \sim -3\pi$ | 3 | $-2$ |
| $-3\pi \sim -5\pi/2$ | 0 | $-1$ |
| $-5\pi/2 \sim -2\pi$ | 1 | $-1$ |
| $-2\pi \sim -3\pi/2$ | 2 | $-1$ |
| $-3\pi/2 \sim -\pi$ | 3 | $-1$ |
| $-\pi \sim -\pi/2$ | 0 | 0 |
| $-\pi/2 \sim 0$ | 1 | 0 |
| $0 \sim \pi/2$ | 2 | 0 |
| $\pi/2 \sim \pi$ | 3 | 0 |
| $\pi \sim 3\pi/2$ | 0 | 1 |
| $3\pi/2 \sim 2\pi$ | 1 | 1 |
| $2\pi \sim 5\pi/2$ | 2 | 1 |
| $5\pi/2 \sim 3\pi$ | 3 | 1 |
| $3\pi \sim 7\pi/2$ | 0 | 2 |
| $7\pi/2 \sim 4\pi$ | 1 | 2 |
| ⋮ | | |

Based on the above logic discrimination, the quadrant discriminating unit 28 outputs an eighth digital signal 29a corresponding to the mark "M" of quadrant and a ninth digital signal 29b corresponding to the mark "N" of quadrant. Referring back to FIG. 2, the phase modulation index computing unit 31 executes the computation below based on the components $V_{2,cos}$ and $V_{3,cos}$ of the sixth digital signal 26 indicated by the formulas (9),(10), and the components $V_{2,sin}$ and $V_{3,sin}$ of the seventh digital signal 27 indicated by the formulas (12),(13).

$$g[(V_{2,cos}^2 + V_{2,sin}^2)^{\frac{1}{2}}/(V_{3,cos}^2 + V_{3,sin}^2)^{\frac{1}{2}}] = g[|J_2(\eta)/J_4(\eta)|] = \quad (14)$$
$$|J_2(\eta)/J_1(\eta)|$$

Note, g[ ] indicates a function for converting $|J_2(\eta)/J_4(\eta)|$ to $|J_2(\eta)/J_1(\eta)|$.

The phase modulation index computing unit 31 outputs a tenth digital signal 32 corresponding to the computed value shown by the formula (14).

Next, the angular velocity computing unit 30 executes the computation below based on the components $V_{1,cos}$ and $V_{2,cos}$ of the sixth digital signal 26 indicated by the formulas (8),(9), the components $V_{1,sin}$ and $V_{2,sin}$ of the seventh digital signal 27 indicated by the formulas (11),(12), and the tenth digital signal 32 indicated by the formula (14).

$$Q = |J_2(\eta)/J_1(\eta)| \times \quad (15)$$
$$[(V_{1,cos}^2 + V_{1,sin}^2)^{\frac{1}{2}}/(V_{2,cos}^2 + V_{2,sin}^2)^{\frac{1}{2}}]$$
$$= |\tan(\phi_s)|$$

The angular velocity computing unit 30 responds to the computed value shown by the formula (15) and the eighth and ninth digital signals 29a, 29b corresponding to the quadrant of presence of the phase difference $\phi$ s shown in Table (b), computes the phase difference $\phi$ s based on Sagnac effect, and outputs an eleventh digital signal 33 corresponding to the computed phase difference (i.e., a signal proportional to the input rotation angular velocity).

Figure 5A:
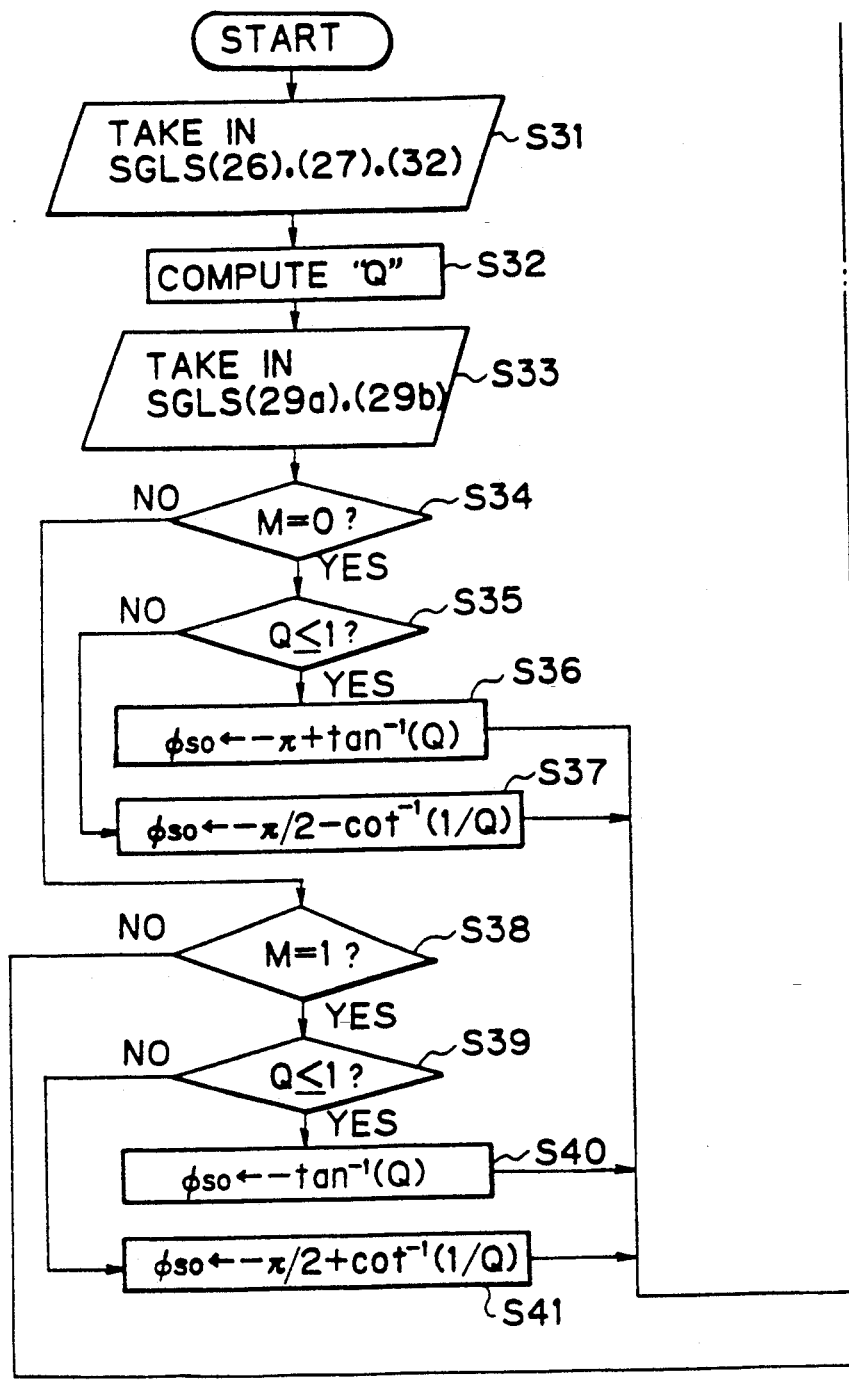
FIGS. 5A and 5B are flow charts representing an example of the processing executed by the angular velocity computing unit shown in FIG. 2.
Figure 5B:
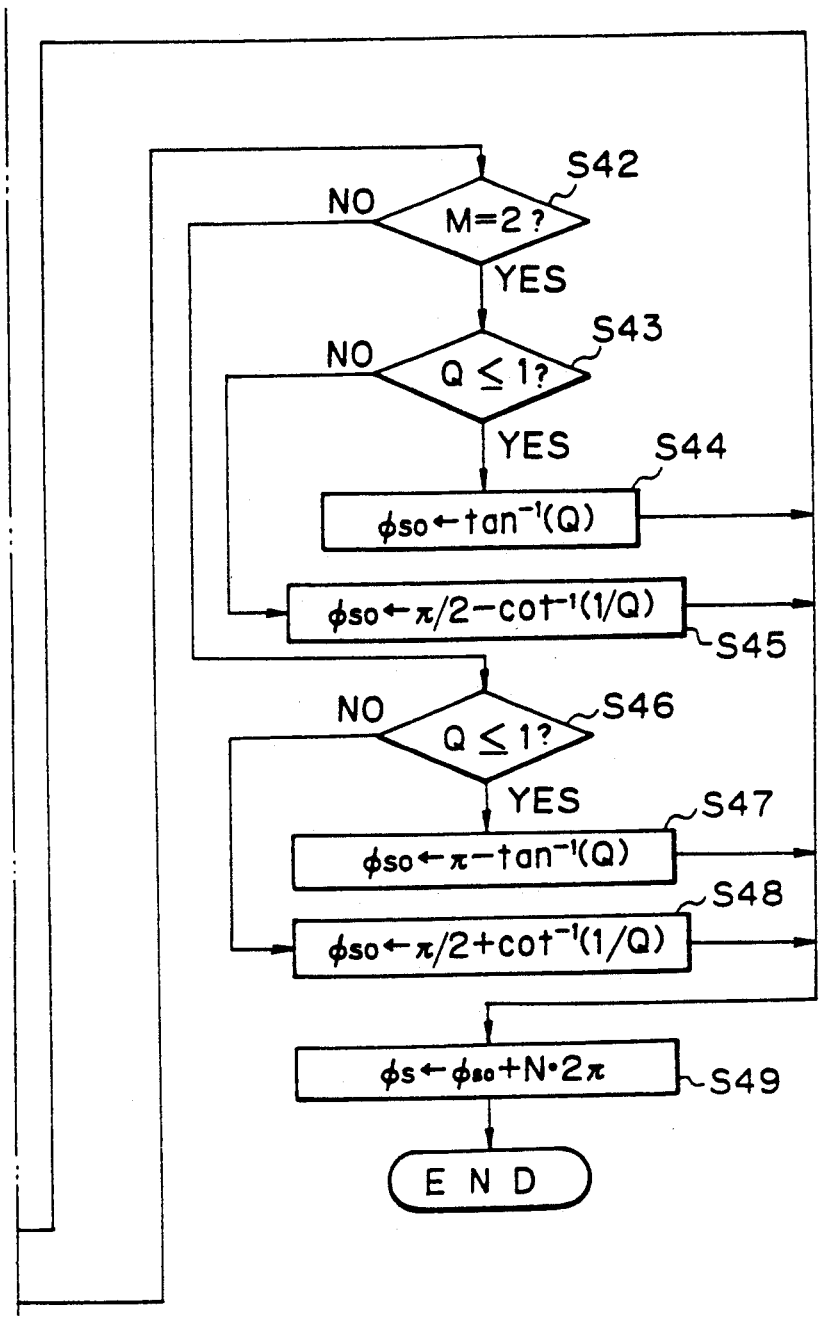

FIGS. 5A and 5B represent an example of the processing executed by the angular velocity computing unit 30.

First, at step S31, the unit 30 takes in the sixth, seventh and tenth digital signals 26,27 and 32. At step S32, the value of Q shown by the formula (15) is computed. At the next step S33, the unit 30 takes in the eighth and ninth digital signals 29a,29b.

At step S34, the unit 30 judges whether the aforementioned mark "M" of quadrant is equal to zero (YES) or not (NO). If the result of judgement indicates YES, the control proceeds to step S35, and if the result of judgement indicates NO, the control proceeds to step S38. At step S35, the unit 30 judges whether the value of Q is less than or equal to "1" (YES) or not (NO). If the result of judgement indicates YES, the control proceeds to step S36, and if the result of judgement indicates NO, the control proceeds to step S37. At step S36, the computation of $[-\pi+\tan^{-1}(Q)]$ is carried out and the result thereof is set as a value of $\phi_{SO}$. On the other hand, at step S37, the computation of $[-\pi/2 -\cot^{-1}(1/Q)]$ is carried out and the result thereof is set as the value of $\phi_{SO}$.

After the completion of the processings at steps S36,S37, the control proceeds to step S49, where $2\pi N$ is added to the value of $\phi_{SO}$ to thereby produce the phase difference $\phi_s$ based on Sagnac effect. After this processing, the control comes to an "END".

Note, the explanation on each processing at the remaining steps S38 to S41, S42 to S45, and S46 to S48 is omitted because it is easily deduced from the explanation on the above steps S34 to S37.

Figure 6:
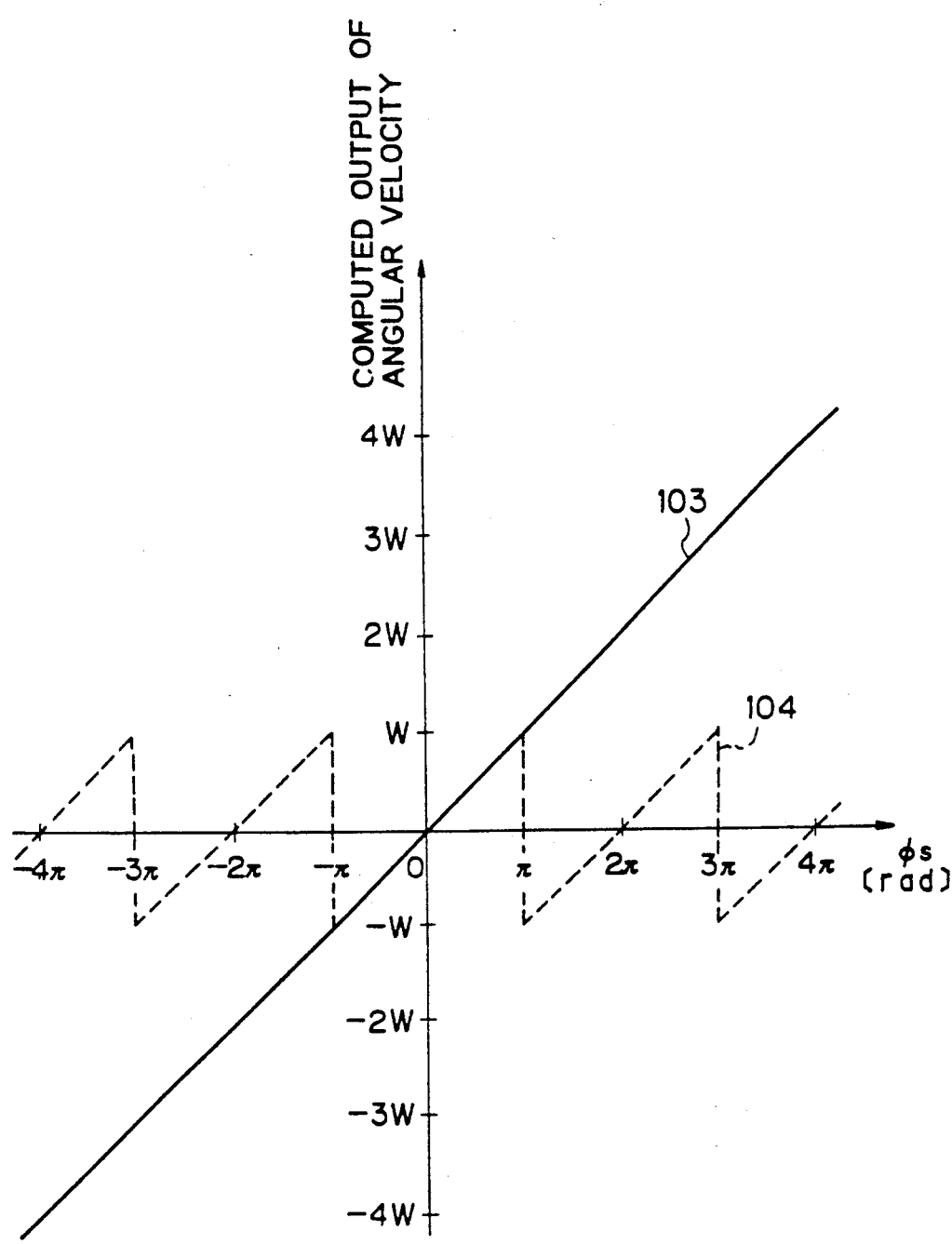
FIG. 6 is a waveform diagram showing the gyro output (33) obtained by the apparatus of FIG. 2.

The eleventh digital signal 33 (i.e., gyro output) produced based on the above processings corresponds to a waveform 103 shown by a solid line in FIG. 6. Also, the value of $\phi_{SO}$ in the flowchart of FIGS. 5A and 5B corresponds to a waveform 104 shown by a broken line in FIG. 6.

Figure 7:
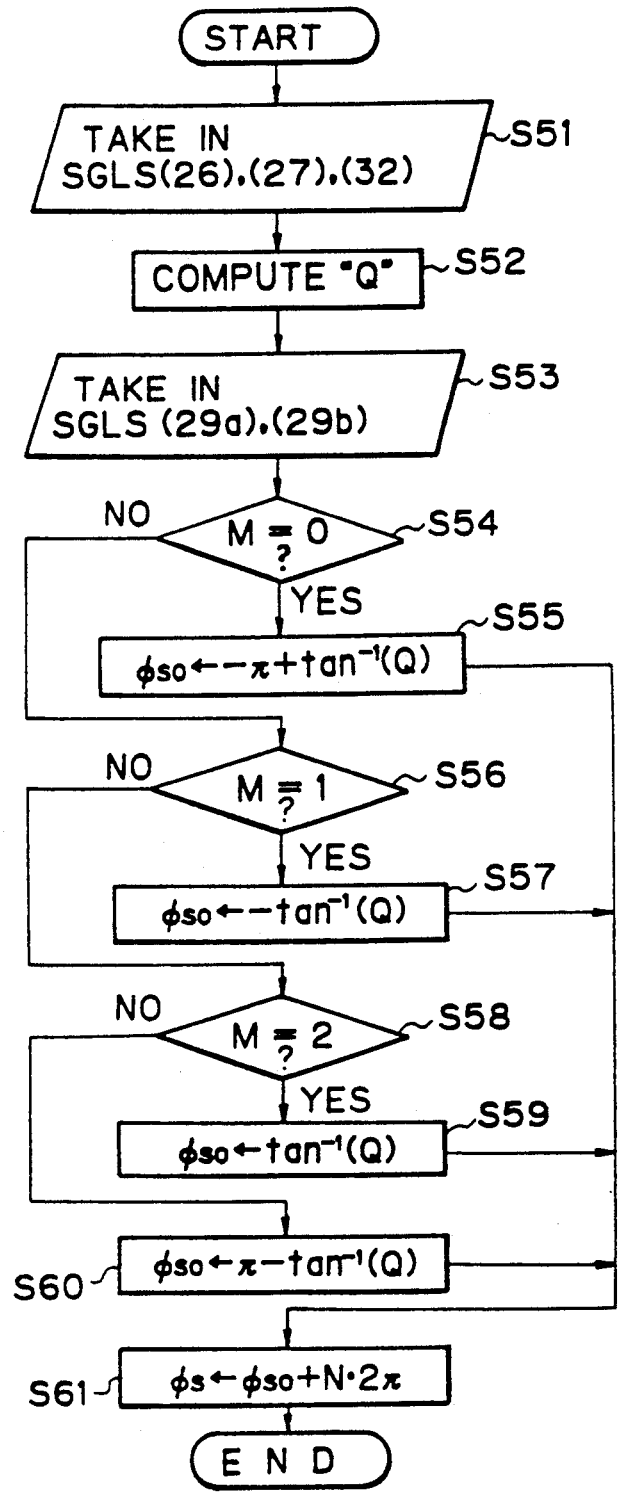
FIG. 7 is a flow chart representing another example of the processing executed by the angular velocity computing unit shown in FIG. 2.

FIG. 7 represents another example of the processing executed by the angular velocity computing unit 30. The explanation on each processing at steps S51 to S61 is omitted because it is easily deduced from the flowchart of FIGS. 5A and 5B.

As explained above, according to the present embodiment, the angular velocity computing unit 30 executes the computation indicated by the formula (15) based on the output of the first digital multiplier 20a and first digital filter 20c indicated by the formulas (8),(9), the output of the second digital multiplier 20b and second digital filter 20d indicated by the formulas (11),(12) and the output of the phase modulation index computing unit 31 indicated by the formula (14) and, based on the computed values and the eighth and ninth digital signals 29a,29b corresponding to the quadrant of presence of the phase difference $\phi$ s determined by the logic discrimination of Table (b), executes the computation as shown in FIGS. 5A, 5B or FIG. 7 to thereby output the corresponding digital signal as the gyro output signal 33.

Therefore, it is possible to obtain a gyro output signal in accurate proportion to the input rotation angular velocity and expand a maximum range of detection of the angular velocity.

Also, it is possible to perfectly remove various influences by a fluctuation in the quantity of incoherent light of the light beam incident on the photoelectric transducing circuit, a fluctuation in the phase modulation index or a fluctuation in the phase difference between the photoelectric output signal 7 and the phase modulator drive signal 8. As a result, the linearity and scale factor stability of the gyro are improved.

Furthermore, the signal components of fm, 2fm and 4fm taken out of the photoelectric output signal 7 by the first to third heterodyne mixers 9a,9b and 9c are converted by the A/D converter 18 to the digital signal 19 and then the converted signal 19 is digitally demodulated by the digital multipliers 20a,20b and the digital filters 20c,20d. Accordingly, it is possible to prevent an occurrence of offset voltages due to an analog demodulation as seen in the prior art. This contributes to an improvement in the bias stability of the gyro.

Next, a second embodiment of the present invention will be explained with reference to FIGS. 8 to 13, and FIGS. 3, 4A, 4B and 6.

In the like manner as the first embodiment, the related prior art will be first explained with reference to FIGS. 8 and 9.

Figure 8:
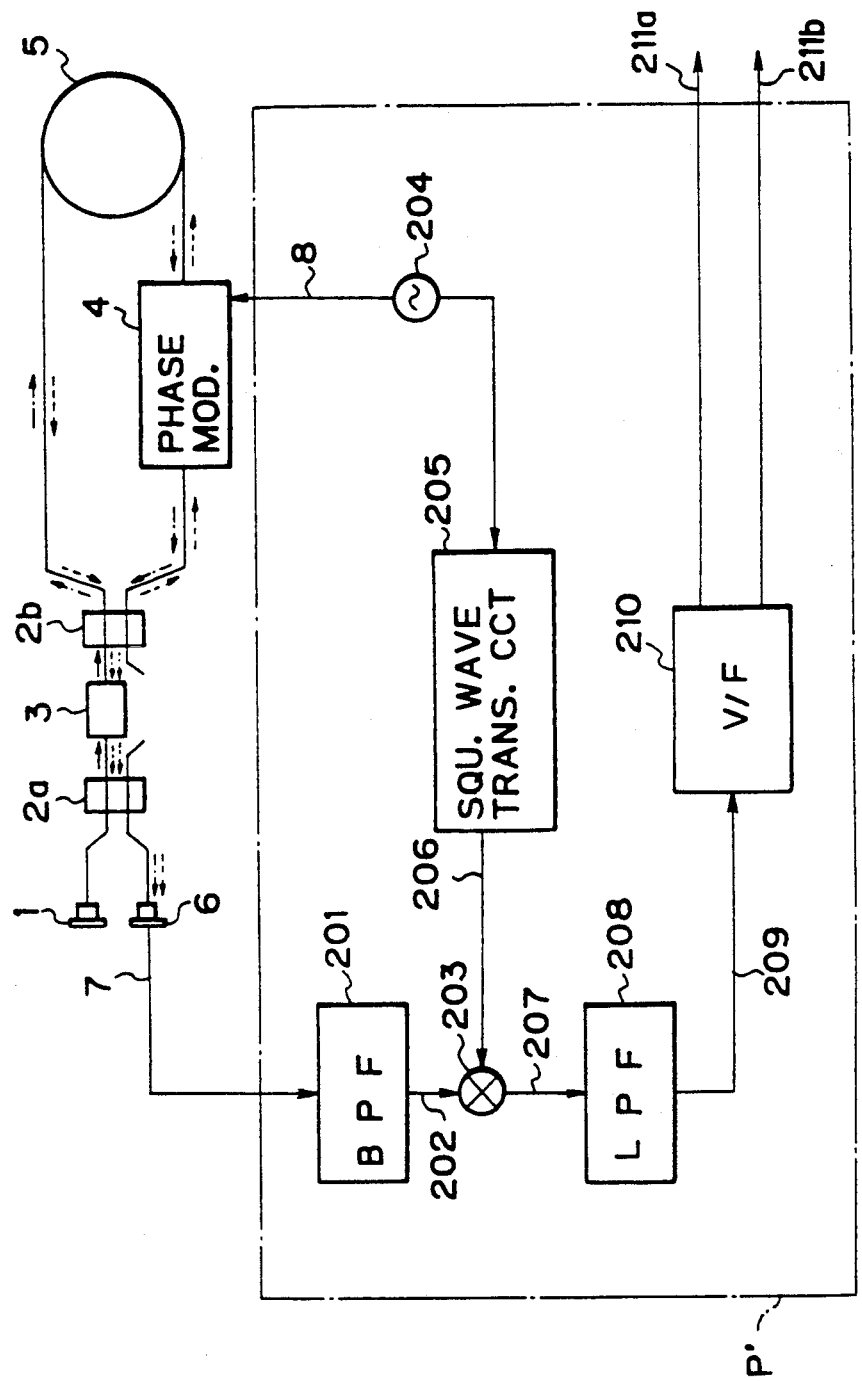
FIG. 8 is a block diagram illustrating, partially schematically, a constitution of another prior art fiber optical gyro using a phase modulation.

FIG. 8 illustrates, partially schematically, a constitution of another prior art fiber optical gyro using a phase modulation.

The illustrated constitution and the operation thereof are the same as those of FIG. 1, except that there is additionally provided a voltage to frequency (V/F) converter 210 which outputs a positive angular increment signal 211a and a negative angular increment signal 211b based on the gyro output signal 209, and thus the explanation thereof is omitted. Note, reference P' denotes a signal processing circuit.

Figure 9:
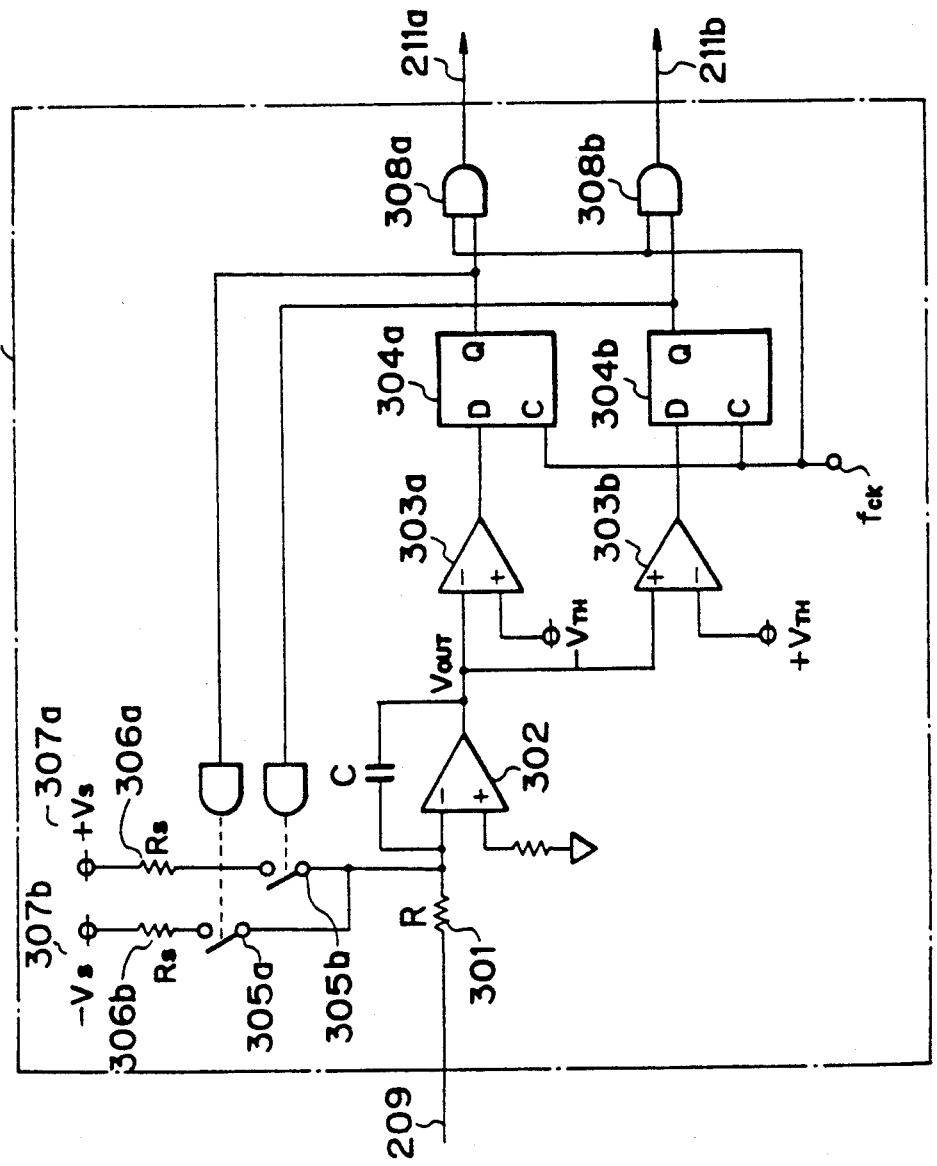
FIG. 9 is a circuit diagram illustrating a constitution of the V/F converter shown in FIG. 8.

FIG. 9 illustrates a circuit constitution of the V/F converter 210. In the illustration, references 301, 306a and 306b denote first, second and third resistors, respectively; reference 302 an integrator; references 303a and 303b first and second comparators, respectively; references 304a and 304b first and second flip-flops, respectively; references 305a and 305b first and second analog switches, respectively; references 307a and 307b first and second reference voltages, respectively; and references 308a and 308b first and second AND gates, respectively.

In the above signal processing circuit P', the produced gyro output signal 209 is input to the V/F converter 210 to thereby obtained as the angular increment output signal 211 (211a,211b). The angular increment output signal 211 is expressed by the following formula:

$$f_{out} \propto (R_s/R) \cdot |V_0|/V_s \cdot f_{ck} \tag{1a}$$

Note, $f_{out}$ denotes the angular increment output signal 11 which indicates the number of output pulses corresponding to the angular increment per unit time. Also, R denotes a resistance value of the first resistor 301; Rs a resistance value of the second resistor 306a or third resistor 306b; $V_0$ the gyro output signal; Vs an absolute value of the first reference voltage 307a or second reference voltage 307b; and $f_{ck}$ a clock frequency. The clock frequency indicates an inverse number of the time during which the first analog switch 305a or second analog switch 305b is closed.

The angular increment output signal 211 expressed by the formula (1a) is output as the signal 211a where the input rotation angular velocity indicates "positive", and output as the signal 211b where the input rotation angular velocity indicates "negative".

In the prior art signal processing circuit P', the angular increment output signals 211a, 211b are proportional to sin $\phi$ s even if the offset voltages $U_1$, $U_2$ are zero (0). As a result, a drawback occurs in that the linearity for the input rotation angular velocity $\Omega$ is not good and the detectable maximum angular velocity is limited to the range corresponding to $\pm\pi/2$ [rad] for the phase difference $\phi$s based on Sagnac effect.

Also, a problem occurs in that the linearity and scale factor stability of the angular increment output signals 211a, 211b are easily deteriorated due to a fluctuation in the quantity $P_0$ of incoherent light of the eighth light beam incident on the photoelectric transducing circuit, a fluctuation in the phase modulation index $\psi$, a fluctuation in the phase difference $\psi_0$, a fluctuation in each resistance value of the resistors 301,306a and 306b, and a fluctuation in the reference voltages 307a and 307b.

Furthermore, another problem occurs in that, even if the input rotation angular velocity is zero, the bias stability of the gyro is easily lowered due to fluctuations in the offset voltages $U_1$ and $U_2$.

Figure 10:
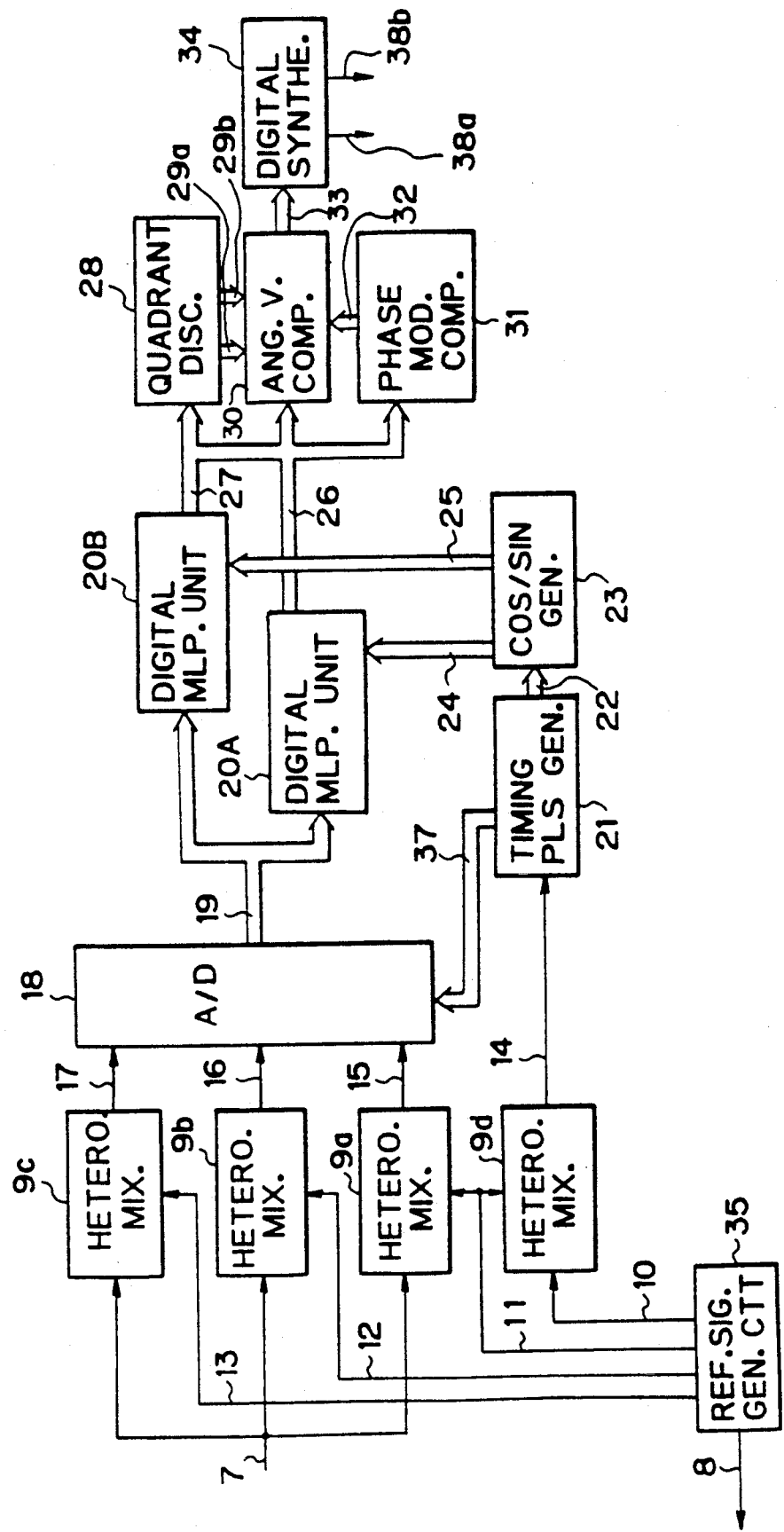
FIG. 10 is a block diagram illustrating a constitution of the signal processing apparatus according to a second embodiment of the present invention.

FIG. 10 illustrates a constitution of the signal processing apparatus according to the second embodiment of the present invention.

The illustrated signal processing apparatus can be applied by substituting it for, e.g., the signal processing circuit P' of the fiber optical gyro shown in FIG. 8. The constitution of the apparatus and the operation thereof are the same as those of FIG. 2, except that there is additionally provided a digital synthesizer 34 which outputs a fifteenth digital signal 38a and a sixteenth digital signal 38b based on the gyro output (eleventh digital signal 33), and thus the explanation thereof is omitted. Also, references 20A and 20B denote first and second digital multiplying units, respectively. The function of the unit 20A (20B) corresponds to the combined function of the digital multiplier 20a (20b) and digital filter 20c (20d) shown in FIG. 2.

As described later, the fifteenth digital signal 38a indicates a polarity of the gyro output (eleventh digital signal 33), i.e., whether the angular increment is positive or negative, and the sixteenth digital signal 38b indicates the number of pulses corresponding to the angular increment proportional to the input rotation angular velocity.

The components $V_{1,cos}$ and $V_{1,sin}$ of the sixth and seventh digital signals 26,27 correspond to the normalized demodulated output 101 shown by a solid line in FIG. 3 and the components $V_{2,cos}$, $V_{3,cos}$, $V_{2,sin}$ and $V_{3,sin}$ thereof correspond to the normalized demodulated output 102 shown by a broken line therein.

Also, the quadrant discriminating unit 28 executes the processings represented by the flowcharts of FIGS. 4A and 4B.

Figure 11A:
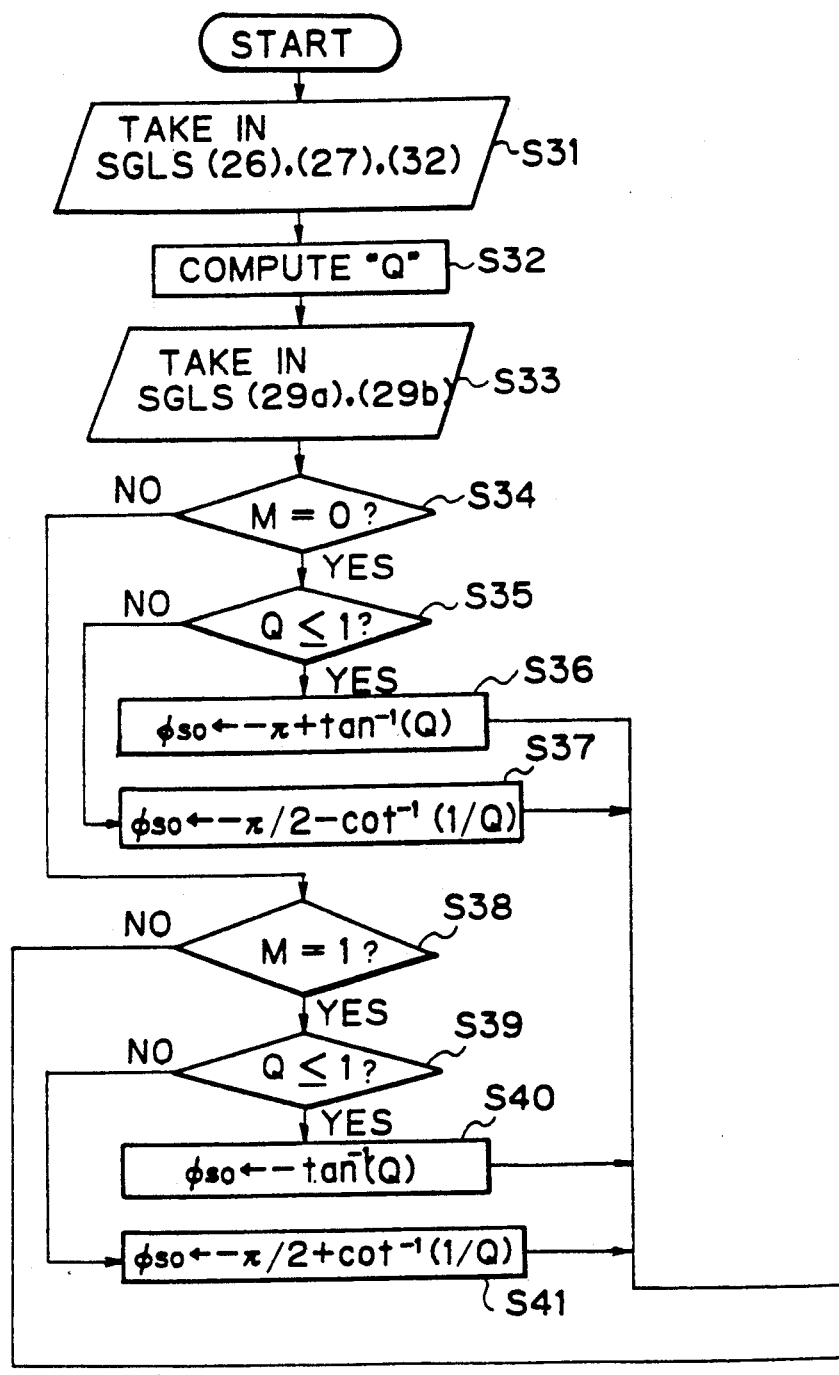
FIGS. 11A and 11B are flow charts representing an example of the processing executed by the angular velocity computing unit shown in FIG. 10.
Figure 11B:
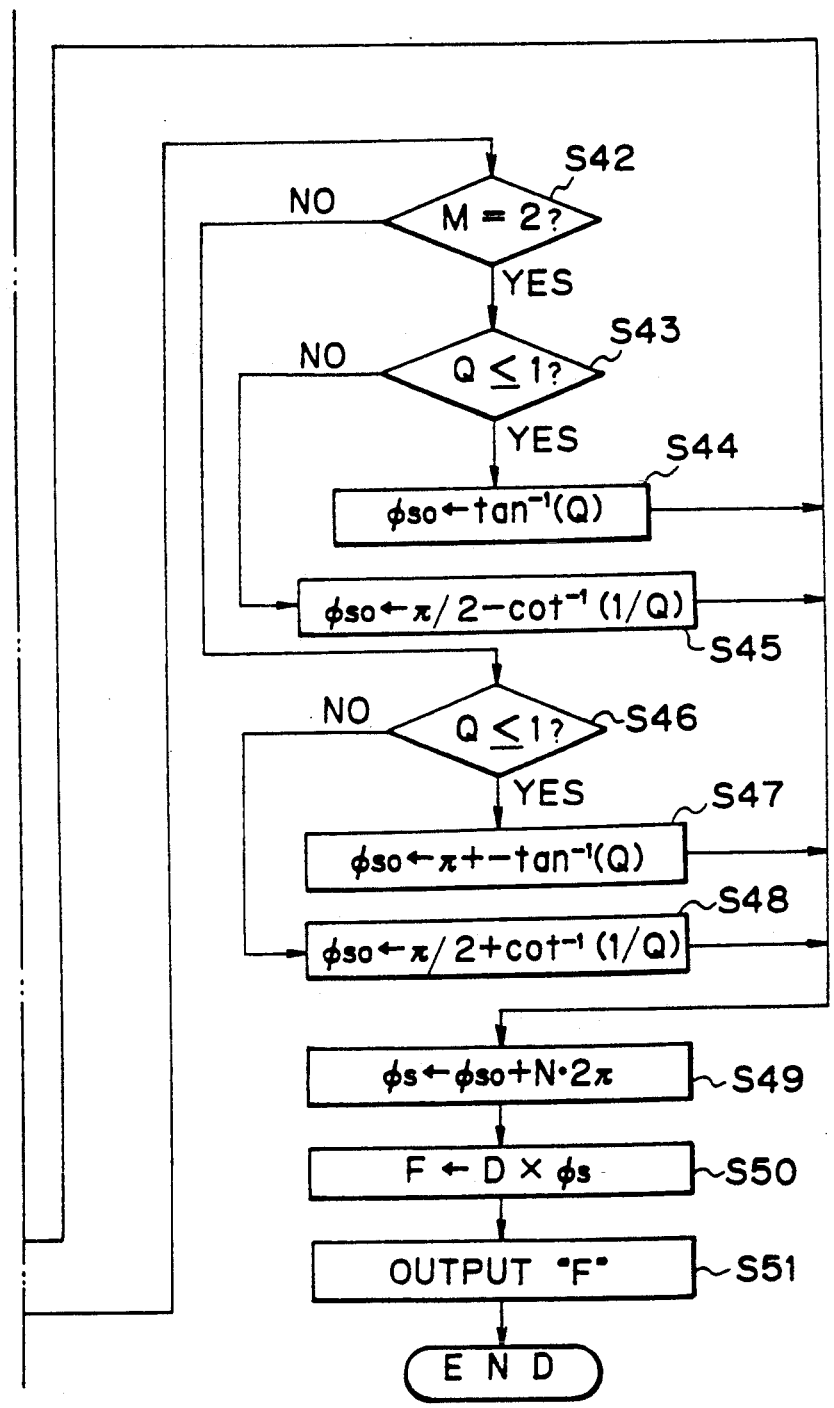

FIGS. 11A and 11B represent an example of the processing executed by the angular velocity computing unit 30 in FIG. 10.

Note, respective processings at steps S31 to S49 are the same as those in FIG. 5, except that steps S50 and S51 are newly added thereto, and thus the explanation thereof is omitted.

At step S50, the unit 30 multiplies the phase difference $\phi$s computed at step S49 by a predetermined value "D" to thereby compute a value of "F" (eleventh digital signal 33) proportional to the input rotation angular velocity. At the next step S51, the unit 30 outputs the computed value of "F". After this processing, the control comes to an "END".

The eleventh digital signal 33 (i.e., gyro output) produced based on the above processings corresponds to the waveform 103 shown by a solid line in FIG. 6 and the value of $\phi_{SO}$ in the flowchart of FIGS. 11A and 11B corresponds to the waveform 104 shown by a broken line therein.

Figure 12:
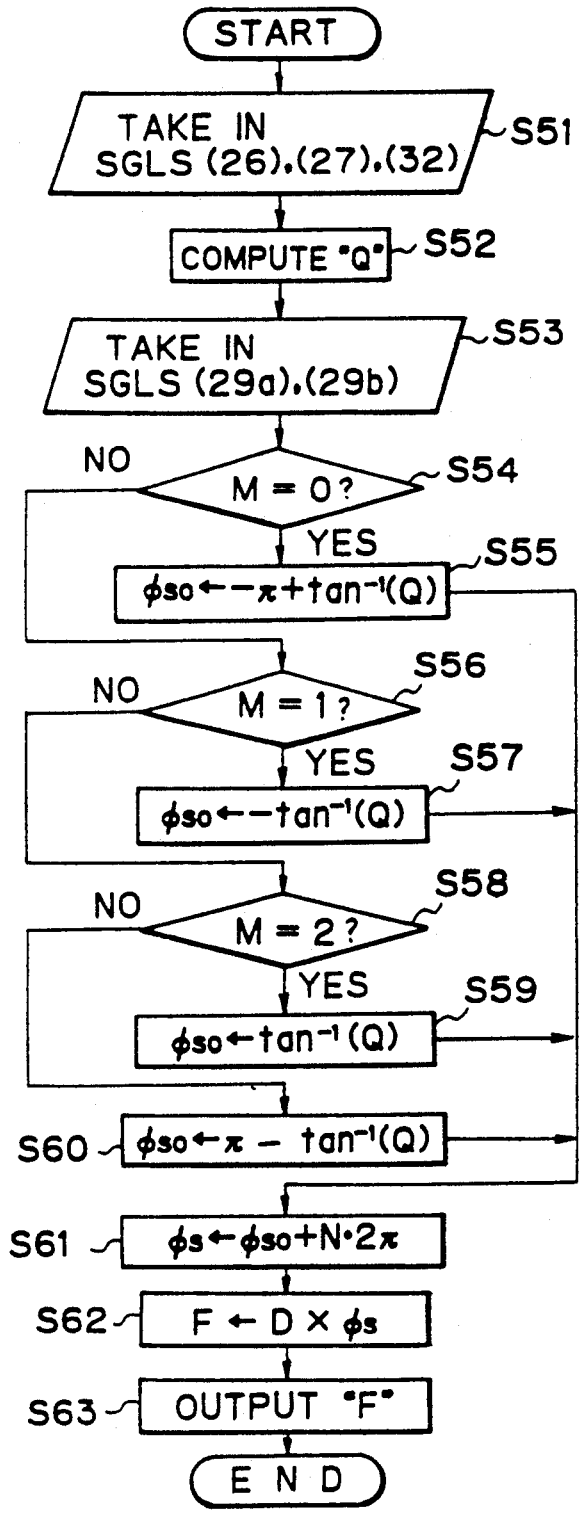
FIG. 12 is a flow chart representing another example of the processing executed by the angular velocity computing unit shown in FIG. 10.

FIG. 12 represents another example of the processing executed by the angular velocity computing unit 30. The explanation on each processing at steps S51 to S63 is omitted because it is easily deduced from the flowchart of FIGS. 11A and 11B.

Figure 13:
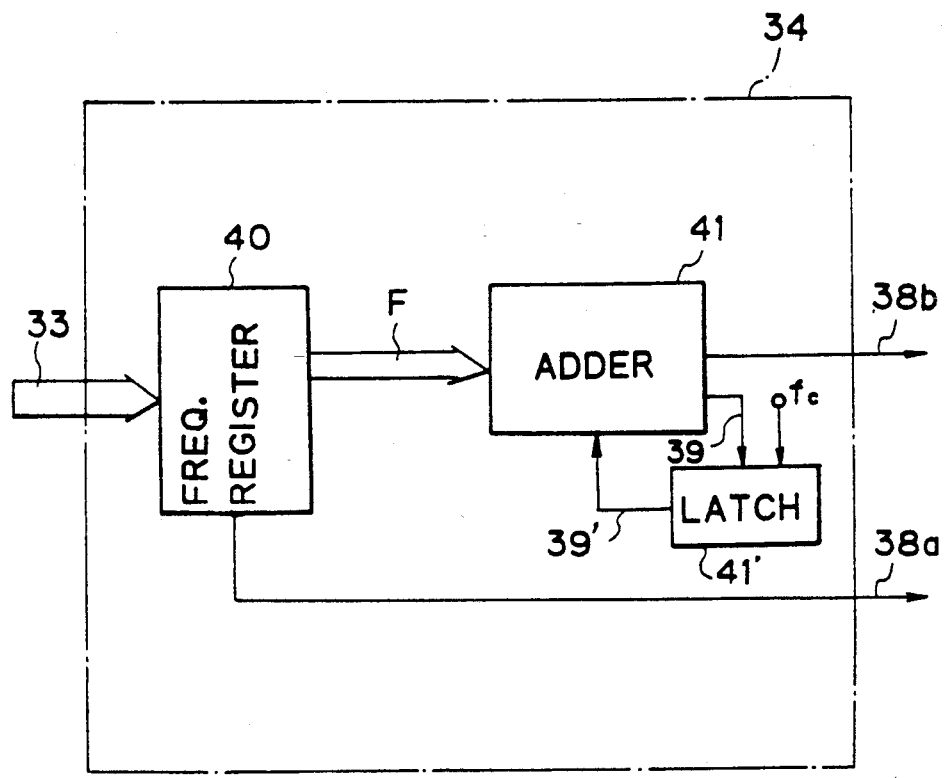
FIG. 13 is a circuit diagram illustrating a constitution of the digital synthesizer shown in FIG. 10.

FIG. 13 illustrates a circuit constitution of the digital synthesizer 34.

The digital synthesizer 34 includes a frequency register 40, an adder 41 and a latch circuit 41'. The frequency register 40 latches a frequency (F) of the eleventh digital signal 33 output from the angular velocity computing unit 30 and outputs the fifteenth digital signal 38a which indicates the polarity of the digital signal 33 (i.e., the angular increment or angular decrement). Also, the latch circuit 41' responds to a clock fc, latches a seventeenth digital signal 39 corresponding to an addition data of the adder 41 every one cycle of the clock fc, and outputs an eighteenth digital signal 39' corresponding to a previous addition data as an output corresponding to a new addition data (seventeenth digital signal 39).

The adder 41 effects an addition of the signal "F" indicating the frequency from the frequency register 40 to the eighteenth digital signal 39' from the latch circuit 41' and outputs the seventeenth digital signal 39 corresponding to the addition data. The adder 41 repeats the above addition for its maximum addition value "E" at the frequency of the clock fc and, when its overflow occurs, outputs the sixteenth digital signal 38b indicating its "carry". Accordingly, a pulse which the adder 41 outputs every time its overflow occurs indicates the angular increment proportional to the input rotation angular velocity.

The angular increment signals 38a,38b output from the digital synthesizer 34 are expressed by the following formulas:

<fifteenth digital signal 38a>;
$$H = \text{sign}(F) \tag{16}$$

<sixteenth digital signal 38b>;
$$f_{out} = f_c \cdot |F|/E \tag{17}$$

Note, F denotes the eleventh digital signal 33; sign (F) a sign of the signal 33; H a polarity of the angular increment; $f_c$ the clock frequency of the digital synthesizer 34; $f_c/E$ a minimum output frequency of the digital synthesizer 34; and $f_{out}$ the angular increment output signal which indicates the number of output pulses corresponding to the angular increment per unit time.

As explained above, according to the second embodiment, it is possible to obtain not only the same advantages or effects as those obtained by the first embodiment, but also the advantage or effect below.

Namely, since the gyro output signal 33 output from the angular velocity computing unit 30 is digitally transduced by the digital synthesizer 34 into the angular increment output signal, it is possible to remove a fluctuation in the scale factor occurring due to the use of an analog element as seen in the prior art (e.g., V/F converter 210 in FIGS. 8 and 9). As a result, it is possible to obtain the angular increment output signal in accurate proportion to the input rotation angular velocity.

Next, a third embodiment of the present invention will be explained with reference to FIGS. 14 to 17

Figure 14:
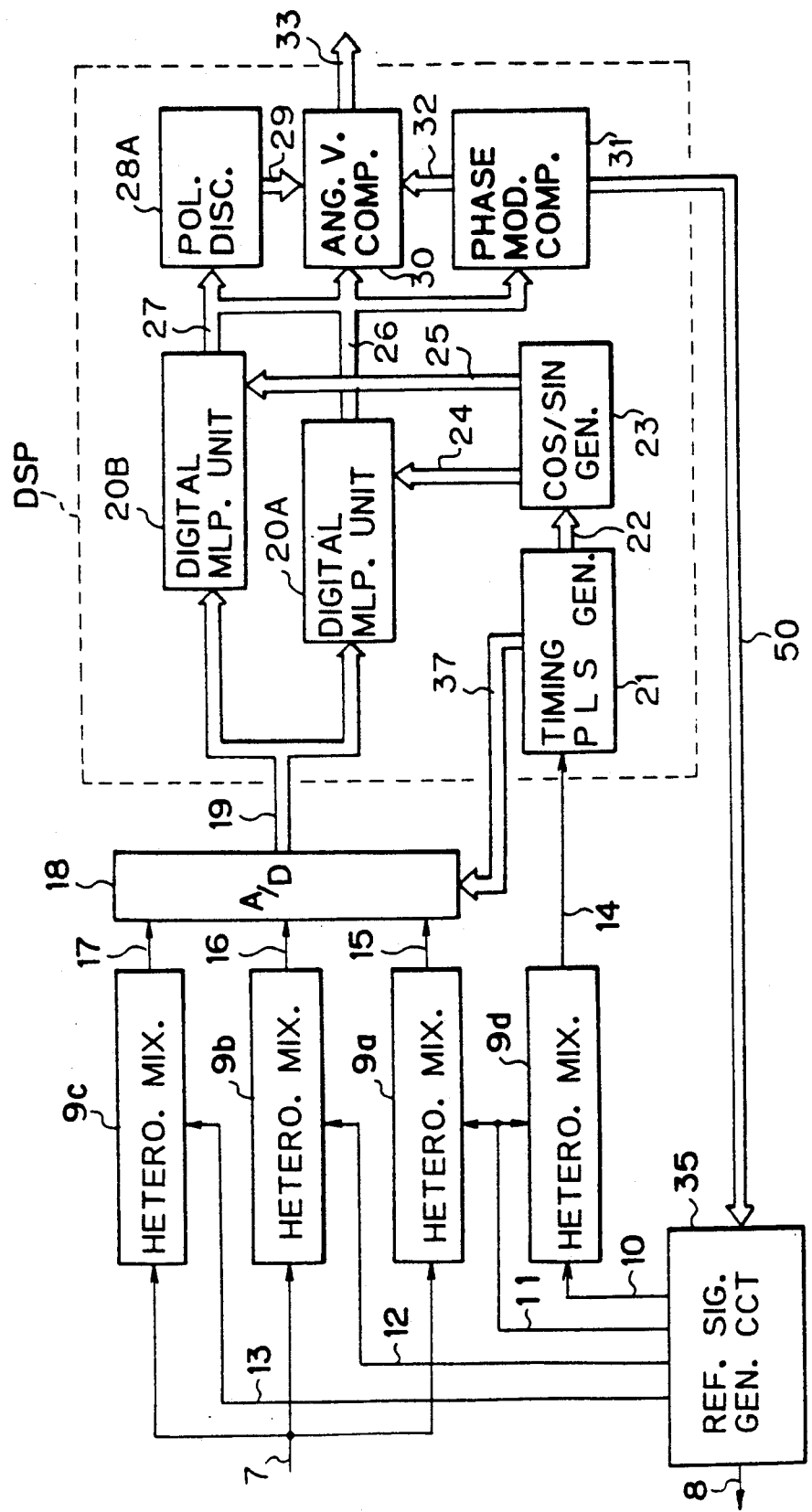
FIG. 14 is a block diagram illustrating a constitution of the signal processing apparatus according to a third embodiment of the present invention.

FIG. 14 illustrates a constitution of the signal processing apparatus according to the third embodiment of the present invention.

The illustrated signal processing apparatus is directed to improve the prior art shown in FIG. 1 and thus can be applied by substituting it for the signal processing circuit P shown therein.

The constitution of the apparatus and the operation thereof are the same as those of FIG. 2, except several points described below, and thus the explanation thereof is omitted.

First, in place of the quadrant discriminating unit 28 which generates the eighth and ninth digital signal 29a,29b, there is provided a polarity discriminating unit 28A which responds to the sixth and seventh digital signals 26,27 and discriminates a polarity of the input rotation angular velocity to thereby output an eighth digital signal 29. In the present embodiment, the phase modulation index computing unit 31 outputs a ninth digital signal 50 in response to the sixth and seventh digital signals 26,27. The ninth digital signal 50 is a signal for keeping constant a ratio of each amplitude of the signal components corresponding to the frequencies 2fm and 4fm of the photoelectric output signal 7, i.e., $(V_{2,cos}^2 + V_{2,sin}^2)^{\frac{1}{2}}/(V_{3,cos}^2 + V_{3,sin}^2)^{\frac{1}{2}}$ expressed by the formula (14).

The second heterodyne mixer 9b responds to the thirteenth digital signal 12, takes a signal component of a frequency 2fm from the photoelectric output signal 7, converts the signal component to a signal of a frequency $2\Delta fm$, and outputs a second analog signal 16, which is expressed by the following formula:

<second analog signal 16>;

$$V_2 \propto 2P_0 \cos\phi s \cdot J_2(\eta) \cdot \sin(2\Delta\omega_m t + \psi_2) \quad (3')$$

Note, $\psi_2$ indicates a phase difference between the signal component of the frequency 2fm taken out of the photoelectric output signal 7 and the thirteenth digital signal 12 having a frequency of $2(fm+\Delta fm)$.

Also, the third heterodyne mixer 9c responds to the fourteenth digital signal 13, takes a signal component of a frequency 4fm from the photoelectric output signal 7, converts the signal component to a signal of a frequency $4\Delta fm$, and outputs a third analog signal 17, which is expressed by the following formula:

<third analog signal 17>;

$$V_3 \propto 2P_0 \cos\phi s \cdot J_4(\eta) \cdot \sin(4\Delta\omega_m t + \psi_3) \quad (4')$$

Note, $\psi_3$ indicates a phase difference between the signal component of the frequency 4fm taken out of the photoelectric output signal 7 and the fourteenth digital signal 13 having a frequency of $4(fm+\Delta fm)$.

Also, the cos/sin generating unit 23 generates respective additions of values of "cosine" and "sine" of each signal component of the same frequency as, a frequency twice, and a frequency four times that of the third digital signal 22, at every predetermined time. The addition of values of "cosine" and the addition of values of "sine" are output as fourth and fifth digital signals 24 and 25, respectively, which are expressed by the following formulas:

<fourth digital signal 24>;
$$V_{REF,cos} \propto \cos(\Delta\omega_m t + \psi_{REF}) + \cos(2\Delta\omega_m t + \psi_{REF}) + \quad (6')$$
$$\cos(4\Delta\omega_m t + \psi_{REF})$$

<fifth digital signal 25>;

-continued
$$V_{REF,sin} \propto \sin(\Delta\omega_m t + \psi_{REF}) + \sin(2\Delta\omega_m t + \psi_{REF}) + \quad (7')$$
$$\sin(4\Delta\omega_m t + \psi_{REF})$$

References 20A and 20B denote first and second digital multiplying units, respectively. The function of the unit 20A (20B) corresponds to the combined function of the digital multiplier 20a (20b) and digital filter 20c (20d) shown in FIG. 2.

The polarity discriminating unit 28A executes the logic discrimination below based on the components $V_{1,cos}$ and $V_{2,cos}$ or $V_{3,cos}$ of the sixth digital signal 26 and the components $V_{1,sin}$ and $V_{2,sin}$ or $V_{3,sin}$ of the seventh digital signal 27.

Figure 15:
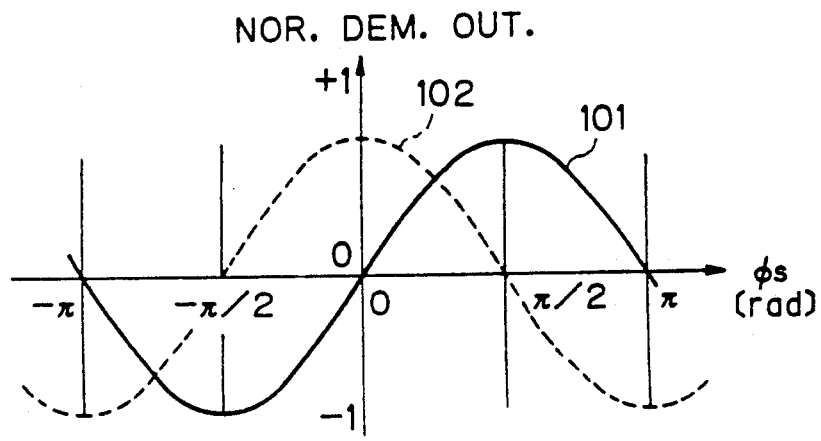
FIG. 15 is a waveform diagram showing the normalized demodulated outputs (26,27) produced in the apparatus of FIG. 14.

Note, the components $V_{1,cos}$ and $V_{1,sin}$ correspond to a normalized demodulated output 101 shown by a solid line in FIG. 15 and the components $V_{2,cos}$, $V_{3,cos}$, $V_{2,sin}$ and $V_{3,sin}$ correspond to a normalized demodulated output 102 shown by a broken line therein.

As is obvious from FIG. 15, signs of each normalized demodulated output 101,102 are changed as shown in Table (c) below with respect to each range of the phase difference $\phi$ s based on Sagnac effect.

TABLE (c)

| $\phi$ s[rad] | sign of signal (101) | sign of signal (102) |
|---|---|---|
| : | : | : |
| $-\pi \sim -\pi/2$ | Negative | Negative |
| $-\pi/2 \sim 0$ | Negative | Positive |
| $0 \sim \pi/2$ | Positive | Positive |
| $\pi/2 \sim \pi$ | Positive | Negative |
| : | : | : |

Based on the logic discrimination shown in Table (c), each range of the phase difference $\phi$ s and the polarity of the input rotation angular velocity are determined. At this time, the polarity discriminating unit 28A outputs the eighth digital signal 29 corresponding to the respective range of the phase difference $\phi$ s.

The angular velocity computing unit 30 executes the computation below based on the components $V_{1,cos}$ and $V_{2,cos}$ of the sixth digital signal 26, the components $V_{1,sin}$ and $V_{2,sin}$ of the seventh digital signal 27, and the tenth digital signal 32.

$$|J_2(\eta)/J_1(\eta)| \times (V_{1,cos}^2 + V_{1,sin}^2)^{\frac{1}{2}}/(V_{2,cos}^2 + V_{2,sin}^2)^{\frac{1}{2}}] = \quad (15a)$$
$$|\tan(\phi s)|$$

$$|J_2(\eta)/J_1(\eta)| \times (V_{2,cos}^2 + V_{2,sin}^2)^{\frac{1}{2}}/(V_{1,cos}^2 + V_{1,sin}^2)^{\frac{1}{2}}] = \quad (15b)$$
$$|\cot(\phi s)|$$

Figure 16:
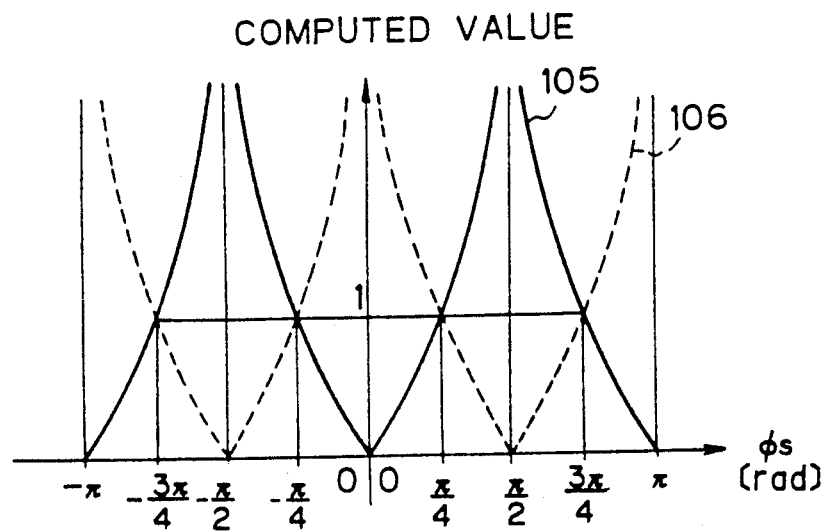
FIG. 16 is a graph showing the relationship between the computed value obtained by the angular velocity computing unit in FIG. 14 and the phase difference $\phi$ s.

Note, the computed value expressed by the formula (15a) corresponds to a curve 105 shown by a solid line in FIG. 16 and the computed value expressed by the formula (15b) corresponds to a curve 106 shown by a broken line therein. The angular velocity computing unit 30 computes the phase difference $\phi$ s based on Sagnac effect as shown in Table (d) below, based on the eighth digital signal 29 corresponding to each range of the phase difference $\phi$ s according to the logic discrimination of Table (c) and the computed values expressed by the formulas (15a), (15b), and outputs the eleventh digital signal 33 corresponding to the computed phase difference (i.e., the signal proportional to the input rotation angular velocity).

TABLE (d)

| φ s[rad] | computed value of unit 30 [rad] |
|---|---|
| $-\pi \sim -3\pi/4$ | $-\pi + \arctan(|\tan(\phi s)|)$ |
| $-3\pi/4 \sim -\pi/2$ | $-\pi/2 - \text{arccot}(|\cot(\phi s)|)$ |
| $-\pi/2 \sim -\pi/4$ | $-\pi/2 + \text{arccot}(|\cot(\phi s)|)$ |
| $-\pi/4 \sim 0$ | $-\arctan(|\tan(\phi s)|)$ |
| $0 \sim \pi/4$ | $\arctan(|\tan(\phi s)|)$ |
| $\pi/4 \sim \pi/2$ | $\pi/2 - \text{arccot}(|\cot(\phi s)|)$ |
| $\pi/2 \sim 3\pi/4$ | $\pi/2 + \text{arccot}(|\cot(\phi s)|)$ |
| $3\pi/4 \sim \pi$ | $\pi - \arctan(|\tan(\phi s)|)$ |

Another example of the computation of the unit 30 for each range of the phase difference φ s is shown in Table (e) below.

TABLE (e)

| φ s[rad] | computed value of unit 30 [rad] |
|---|---|
| $-\pi \sim -\pi/2$ | $-\pi + \arctan(|\tan(\phi s)|)$ |
| $-\pi/2 \sim 0$ | $-\arctan(|\tan(\phi s)|)$ |
| $0 \sim \pi/2$ | $\arctan(|\tan(\phi s)|)$ |
| $\pi/2 \sim \pi$ | $\pi - \arctan(|\tan(\phi s)|)$ |

As explained above, according to the third embodiment, it is possible to obtain not only the same advantages or effects as those obtained by the first embodiment, but also the advantage or effect below.

Namely, the reference signal generating circuit 35 outputs the sixth analog signal 8 (i.e., phase modulator drive signal ) having an output amplitude corresponding to the ninth digital signal 50 output from the phase modulation index computing unit 31. At this time, by forcibly changing the maximum phase shift Φm of the phase modulator 4 (see FIG. 1) by means of the amplitude of the sixth analog signal 8, it is possible to keep constant the phase modulation index η. As a result, it is possible to reduce to a minimum a lowering in the linearity and scale factor stability of the gyro occurring due to a fluctuation in the phase modulation index η caused by a fluctuation in the maximum phase shift η.

Additionally, respective frequencies of the first to third analog signals 15,16 and 17 may be an identical frequency Δfm, or may be a frequency different from each other. Note, in case of the former (i.e., identical frequency), the reference signal generating circuit 35 must be provided with three independent oscillators for generating signals having frequencies of (fm +Δfm), (2fm+Δfm), and (4fm+Δ fm), respectively, and thus the circuit constitution thereof becomes complicated. Also, where a crosstalk arises between the three kinds of signal, it is impossible to easily remove the influence by the crosstalk and thus the precision of the gyro output is deteriorated. On the other hand, in case of the latter (i.e., different frequency), although the influence by the crosstalk can be easily removed, three independent oscillators must be provided and, moreover, the timing pulse generating means and the cos/sin generating means must be provided for each of the first to third analog signals 15, 16 and 17, and thus the entire circuit constitution becomes complicated.

Figure 17:
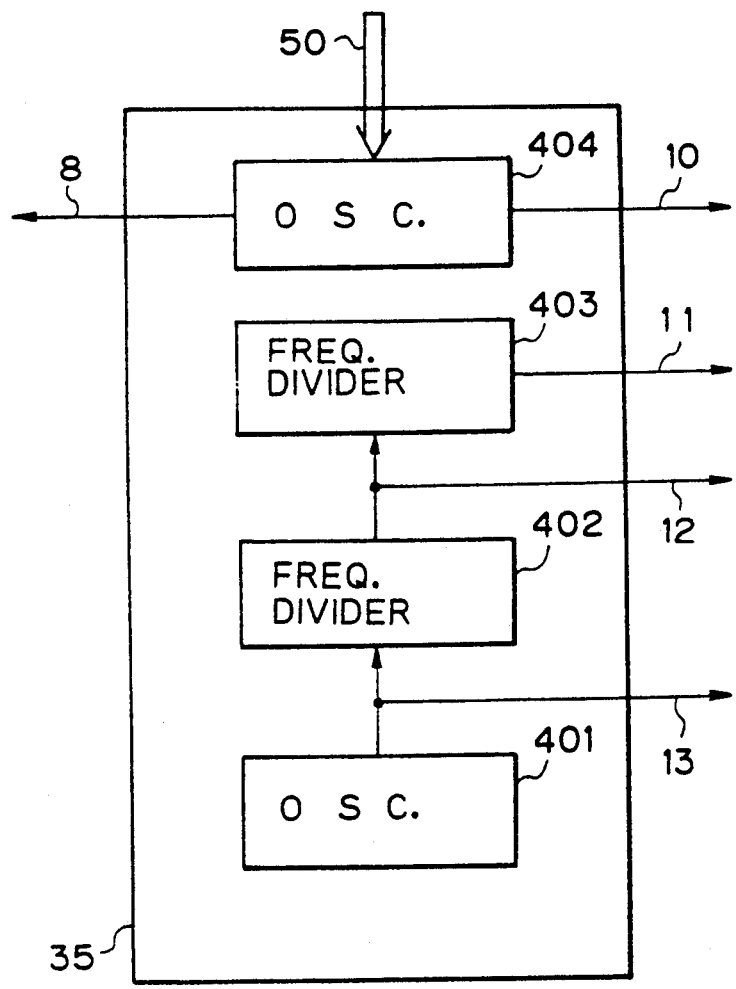
FIG. 17 is a block diagram illustrating a constitution of the reference signal generating circuit shown in FIG. 14.

To cope with this, the present embodiment employs the reference signal generating circuit 35 as shown in FIG. 17.

In the constitution of FIG. 17, a first oscillator 401 outputs the fourteenth digital signal 13 having a frequency of 4(fm +Δfm). The signal 13 is frequency-divided by a first frequency divider 402 to thereby be output as the thirteenth digital signal 12 having a frequency of 2(fm+Δfm). The signal 12 is frequency-divided by a second frequency divider 403 to thereby be output as the twelfth digital signal 11 having a frequency of (fm+Δfm). On the other hand, a second oscillator 404 outputs the sixth analog signal 8 (i.e., phase modulator drive signal ) having the amplitude corresponding to the ninth digital signal 50 which serves to keep constant the ratio of each amplitude of the signal components corresponding to the frequencies 2fm and 4fm of the photoelectric output signal 7, and the fifth analog signal 10 in synchronization in frequency and phase with the sixth analog signal 8.

Next, a fourth embodiment of the present invention will be explained with reference to FIGS. 18 and 19, and FIGS. 15 and 16.

Figure 18:
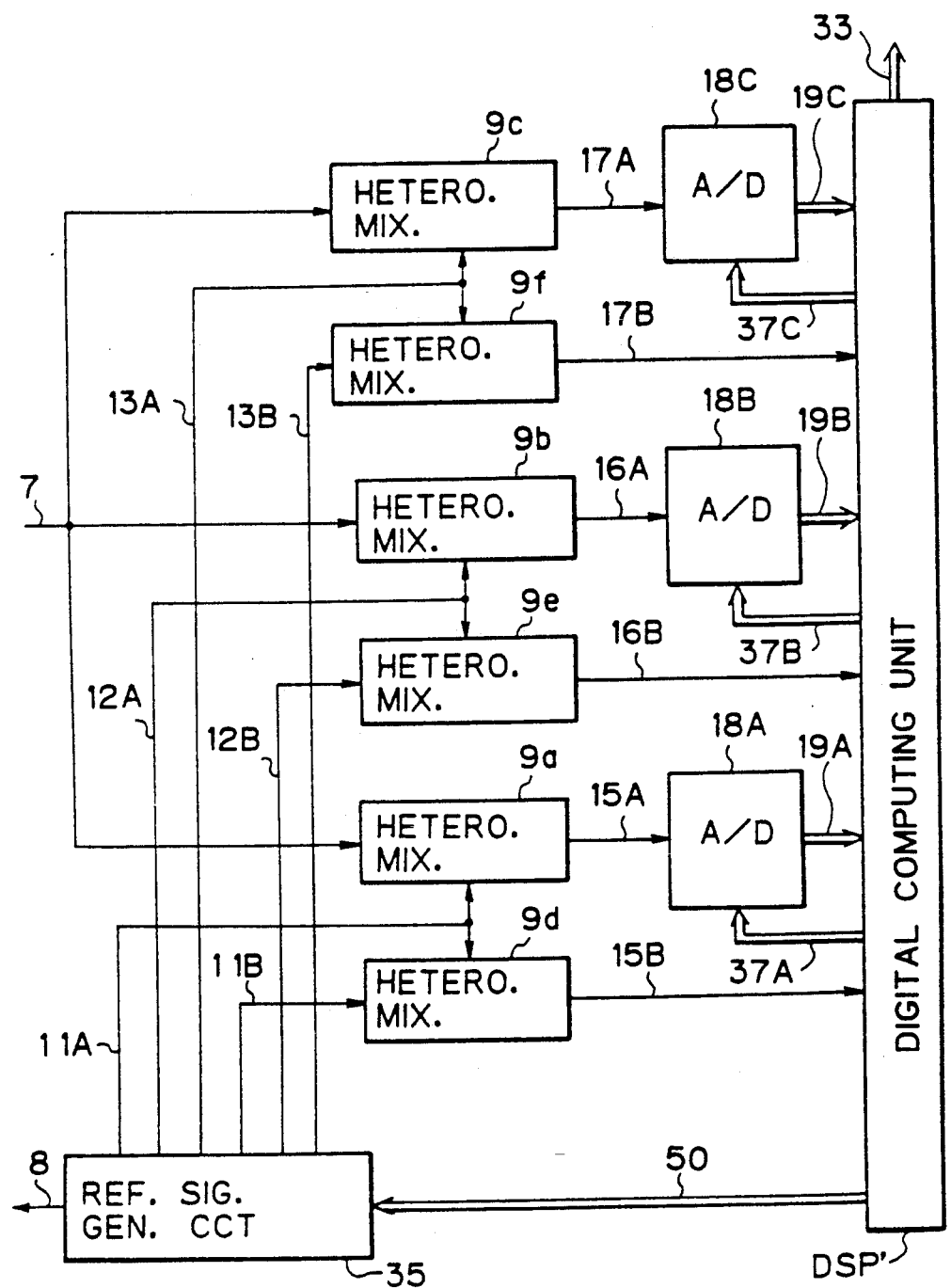
FIG. 18 is a block diagram illustrating a constitution of the signal processing apparatus according to a fourth embodiment of the present invention.
Figure 19:
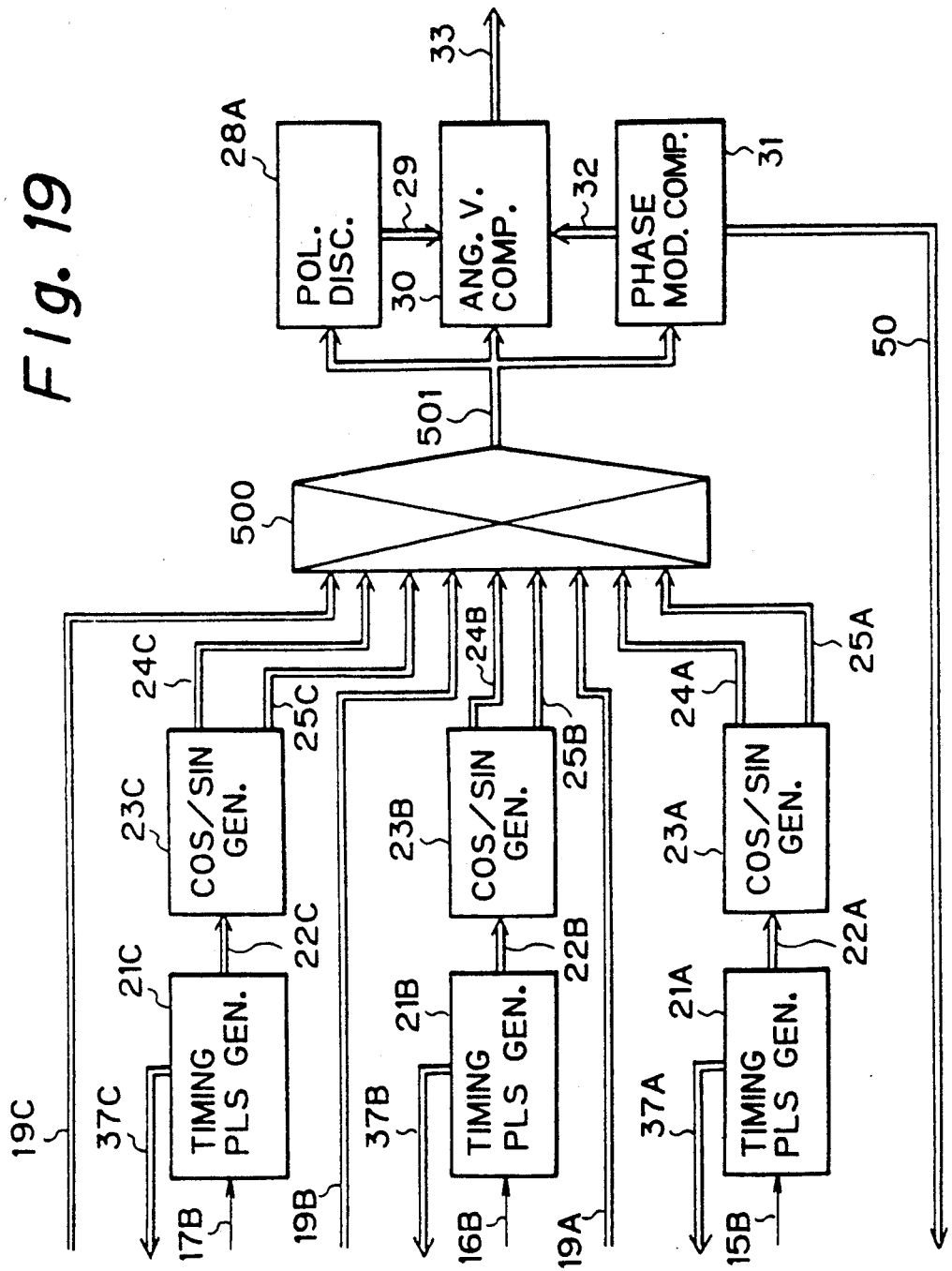
FIG. 19 is a block diagram illustrating a constitution of the digital computing unit shown in FIG. 18.

FIG. 18 illustrates a constitution of the signal processing apparatus according to the fourth embodiment of the present invention, and FIG. 19 illustrates a constitution of the digital computing unit DSP' shown in FIG. 18.

The signal processing apparatus according to the present embodiment is directed to improve the prior art shown in FIG. 1 and thus can be applied by substituting it for the signal processing circuit P shown therein.

The apparatus includes first to sixth heterodyne mixers 9a,9b,9c,9d,9e and 9f, first to third A/D converters 18A,18B and 18C, first to third timing pulse generating units 21A,21B and 21C, first to third cos/sin generating units 23A,23B and 23C, a digital multiplying unit 500, a polarity discriminating unit 28A, an angular velocity computing unit 30, a phase modulation index computing unit 31 and a reference signal generating circuit 35.

The timing pulse generating units 21A,21B,21C, the cos/sin generating units 23A,23B,23C, and the digital multiplying unit 500 execute digital demodulations of the outputs of the A/D converters 18A,18B,18C in cooperation with one another (digital demodulating unit). Also, the digital demodulating unit, the polarity discriminating unit 28A, the angular velocity computing unit 30 and the phase modulation index computing unit 31 constitute a one chip digital signal processor (digital computing unit DSP') and execute the respective operations based on software processing.

The operation of each constituent element will now be explained below.

First, the reference signal generating circuit 35 generates a phase modulator drive signal 8 (tenth analog signal) in synchronization in phase with an eighteenth digital signal 50, a fifth analog reference signal 11B in synchronization in phase with the drive signal 8 and having a frequency of fm, a seventh analog reference signal 12B in synchronization in phase with the drive signal 8 and having a frequency of 2fm, a ninth analog reference signal 13B in synchronization in phase with the drive signal 8 and having a frequency of 4fm, and twenty-first, twenty-second and twenty-third digital reference signals 11A,12A and 13A having repetition frequencies of (fm+Δfm₁), (2fm+Δfm₂) and (4fm+Δfm₃), respectively. The generated analog reference signals 11B,12B and 13B are fed to the fourth heterodyne mixer 9d, the fifth heterodyne mixer 9e, and the sixth heterodyne mixer 9f, respectively, and the generated digital reference signals 11A,12A and 13A are fed to the first and fourth heterodyne mixers 9a,9d, the second and fifth heterodyne mixers 9b,9e, and the third and sixth heterodyne mixers 9c,9f, respectively. Also, the phase-modulated photoelectric output signal 7 is input to the first to third heterodyne mixers 9a~9c.

The first heterodyne mixer 9a responds to the twenty-first digital signal 11A, takes a signal component of the same frequency as a frequency fm of the phase modulator drive signal 8 from the photoelectric output signal 7, converts the signal component to a signal of a frequency $\Delta fm_1$, and outputs a first analog signal 15A, which is expressed by the following formula:

<first analog signal 15A>;

$$V_1 \propto 2P_0 \sin\phi_s \cdot J_1(\eta) \cdot \sin(\Delta\omega_{m1}t + \psi_1) \quad (21)$$

Note, $\Delta\psi_{m1}$ indicates a change in the phase modulator drive angular frequency ($=2\pi\Delta fm_1$), and $\psi_1$ indicates a phase difference between the signal component of the frequency fm taken out of the photoelectric output signal 7 and the twenty-first digital signal 11A having a frequency of (fm+$\Delta fm_1$).

The second heterodyne mixer 9b responds to the twenty-second digital signal 12A, takes a signal component of a frequency 2fm from the photoelectric output signal 7, converts the signal component to a signal of a frequency $\Delta fm_2$, and outputs a second analog signal 16A, which is expressed by the following formula:

<second analog signal 16A>;

$$V_3 \propto 2P_0 \cos\phi_s \cdot J_2(\eta) \cdot \sin(\Delta\omega_{m2}t + \psi_2) \quad (22)$$

Note, $\psi_2$ indicates a phase difference between the signal component of the frequency 2fm taken out of the photoelectric output signal 7 and the twenty-second digital signal 12A having a frequency of (2fm +$\Delta fm_2$).

The third heterodyne mixer 9c responds to the twenty-third digital signal 13A, takes a signal component of a frequency 4fm from the photoelectric output signal 7, converts the signal component to a signal of a frequency $\Delta fm_3$, and outputs a third analog signal 17A, which is expressed by the following formula:

<third analog signal 17A>;

Note, $\psi_3$ indicates a phase difference between the signal component of the frequency 4fm taken out of the photoelectric output signal 7 and the twenty-third digital signal 13A having a frequency of (4fm+$\Delta fm_3$).

The first to third analog signals 15A,16A and 17A are input to the A/D converters 18A,18B and 18C, respectively, to be converted to first, sixth and eleventh digital signals 19A,19B and 19C, respectively. These digital signals are expressed, for example, by binary number.

The fourth heterodyne mixer 9d responds to the twenty-first digital signal 11A, converts the fifth analog signal 11B to a signal of the frequency $\Delta fm_1$, and outputs a fourth analog signal 15B, which is expressed by the following formula:

<fourth analog signal 15B>;

$$V_{REF1} \propto \sin(\Delta\omega_{m1}t + \psi_{REF1}) \quad (24a)$$

Note, $\psi_{REF1}$ indicates a phase difference between the fifth analog signal 11B and the twenty-first digital signal 11A.

Also, the fifth heterodyne mixer 9e responds to the twenty-second digital signal 12A, converts the seventh analog signal 12B to a signal of the frequency $\Delta fm_2$, and outputs a sixth analog signal 16B, which is expressed by the following formula:

<sixth analog signal 16B>;

$$V_{REF2} \propto \sin(\Delta\omega_{m2}t + \psi_{REF2}) \quad (24b)$$

Note, $\psi_{REF2}$ indicates a phase difference between the seventh analog signal 12B and the twenty-second digital signal 12A.

Also, the sixth heterodyne mixer 9f responds to the twenty-third digital signal 13A, converts the ninth analog signal 13B to a signal of the frequency $\Delta fm_3$, and outputs an eighth analog signal 17B, which is expressed by the following formula:

<eighth analog signal 17B>;

Note, $\psi_{REF3}$ indicates a phase difference between the ninth analog signal 13B and the twenty-third digital signal 13A.

The fourth analog signal 15B is input to the first timing pulse generating unit 21A and converted to second and third digital signals 37A, 22A in synchronization in phase therewith. The second digital signal 37A is input to the first A/D converter 18A. The A/D converter 18A converts the first analog signal 15A to the first digital signal 19A in synchronization with the second digital signal 37A. On the other hand, the third digital signal 22A is input to the first cos/sin generating unit 23A.

The first cos/sin generating unit 23A divides one cycle of the third digital signal 22A into time slots at every predetermined time and outputs values of cosine and sine, which are generated at timings corresponding to the time slots and shifted in phase by 90° from each other. The values of cosine and sine are output as fourth and fifth digital signals 24A and 25A, respectively, which are expressed by the following formulas:

<fourth digital signal 24A>;
$$V_{REF1,cos} \propto \cos(\Delta\omega_{m1}t + \phi_{REF1}) \quad (25a)$$
<fifth digital signal 25A>;
$$V_{REF1,sin} \propto \sin(\Delta\omega_{m1}t + \phi_{REF1}) \quad (26a)$$

In the like manner, the sixth analog signal 16B is input to the second timing pulse generating unit 21B and converted to seventh and eighth digital signals 37B, 22B in synchronization in phase therewith. The second digital signal 37B is input to the second A/D converter 18B. The A/D converter 18B converts the second analog signal 16A to the sixth digital signal 19B in synchronization with the seventh digital signal 37B. On the other hand, the eighth digital signal 22B is input to the second cos/sin generating unit 23B.

The second cos/sin generating unit 23B divides one cycle of the eighth digital signal 22B into time slots at every predetermined time and outputs values of cosine and sine, which are generated at timings corresponding to the time slots and shifted in phase by 90° from each other. The values of cosine and sine are output as ninth and tenth digital signals 24B and 25B, respectively, which are expressed by the following formulas:

<ninth digital signal 24B>;
$$V_{REF2, cos} \propto \cos(\Delta\omega_{m2}t + \psi_{REF2}) \quad (25b)$$
<tenth digital signal 25B>;
$$V_{REF2, sin} \propto \sin(\Delta\omega_{m2}t + \psi_{REF2}) \quad (26b)$$

In the like manner, the eighth analog signal 17B is input to the third timing pulse generating unit 21C and converted to twelfth and thirteenth digital signals 37C, 22C in synchronization in phase therewith. The twelfth digital signal 37C is input to the third A/D converter 18C. The A/D converter 18C converts the third analog signal 17A to the eleventh digital signal 19C in synchronization with the twelfth digital signal 37C. On the other hand, the thirteenth digital signal 22C is input to the third cos/sin generating unit 23C.

The third cos/sin generating unit 23C divides one cycle of the thirteenth digital signal 22C into time slots at every predetermined time and outputs values of cosine and sine, which are generated at timings corresponding to the time slots and shifted in phase by 90° from each other. The values of cosine and sine are output as fourteenth and fifteenth digital signals 24C and 25C, respectively, which are expressed by the following formulas:

<fourteenth digital signal 24C>;
$$V_{REF3, cos} \propto \cos(\Delta\omega_{m3}t + \psi_{REF3}) \quad (25c)$$

<fifteenth digital signal 25C>;
$$V_{REF3, sin} \propto \sin(\Delta\omega_{m3}t + \psi_{REF3}) \quad (26c)$$

The digital multiplying unit 500 effects a digital multiplication between the first digital signal 19A and the fourth and fifth digital signals 24A,25A, between the sixth digital signal 19B and the ninth and tenth digital signals 24B,25B, and between the eleventh digital signal 19C and the fourteenth and fifteenth digital signals 24C,25C, respectively. The unit 500 then effects a digital filtering to thereby take DC components from results of the respective multiplications and thus outputs a sixteenth digital signal 501. Respective signals corresponding to the first to third analog signals 15A,16A and 17A of the sixteenth digital signal 501 are expressed by the following formulas:

<sixteenth digital signal 501 corr. to signal 15A>;
$$V_{1, cos} \propto P_0 \sin\phi s \cdot J_1(\eta) \cdot \sin(\psi_1') \quad (27)$$
$$V_{1, sin} \propto P_0 \sin\phi s \cdot J_1(\eta) \cdot \cos(\psi_1') \quad (28)$$

<sixteenth digital signal 501 corr. to signal 16A>;
$$V_{2, cos} \propto P_0 \cos\phi s \cdot J_2(\eta) \cdot \sin(\psi_2') \quad (29)$$
$$V_{2, sin} \propto P_0 \cos\phi s \cdot J_2(\eta) \cdot \cos(\psi_2') \quad (30)$$

<sixteenth digital signal 501 corr. to signal 17A>;
$$V_{3, cos} \propto P_0 \cos\phi s \cdot J_4(\eta) \cdot \sin(\psi_3') \quad (31)$$
$$V_{3, sin} \propto P_0 \cos\phi s \cdot J_4(\eta) \cdot \cos(\psi_3') \quad (32)$$

where
$$\psi_1' = \psi_1 = \psi_{REF}$$
$$\psi_2' = \psi_2 = \psi_{REF}$$
$$\psi_3' = \psi_3 = \psi_{REF}$$

As explained above, since the multiplication and filtering are digitally carried out (i.e., digital demodulation), it is possible to remove a disadvantage in that an offset voltage occurring in analog ICs is overlapped on a demodulated signal as seen in a prior art signal processing (i.e., analog demodulation).

The sixteenth digital signal 501 is input to the polarity discriminating unit 28A. The polarity discriminating unit 28A executes the logic discrimination below based on the components $V_{1,cos}$ and $V_{2,cos}$ or $V_{3,cos}$, and $V_{1,sin}$ and $V_{2,sin}$ or $V_{3,sin}$ of the sixteenth digital signal 501.

Note, the components $V_{1,cos}$ and $V_{1,sin}$ correspond to the normalized demodulated output 101 shown by a solid line in FIG. 15 and the components $V_{2,cos}$, $V_{3,cos}$, $V_{2,sin}$ and $V_{3,sin}$ correspond to the normalized demodulated output 102 shown by a broken line therein.

As is obvious from FIG. 15, signs of each normalized demodulated output 101,102 are changed as shown in Table (c) with respect to each range of the phase difference $\phi s$ based on Sagnac effect.

Based on the logic discrimination shown in Table (c), each range of the phase difference $\phi s$ and the polarity of the input rotation angular velocity are determined. At this time, the polarity discriminating unit 28A outputs a seventeenth digital signal 29 corresponding to the respective ranges of the phase difference $\phi s$.

Next, the phase modulation index computing unit 31 executes the computation below based on the components $V_{2,cos}$, $V_{3,cos}$, $V_{2,sin}$ and $V_{3,sin}$ of the sixteenth digital signal 501.

$$(V_{2, cos}^2 + V_{2, sin}^2)^{\frac{1}{2}}/(V_{3, cos}^2 + V_{3, sin}^2)^{\frac{1}{2}} = |J_2(\eta)/J_4(\eta)| \quad (33)$$

The unit 31 outputs the eighteenth digital signal 50 for keeping constant the computed value expressed by the formula (33) and executes the computation below based on the computed value of the formula (33).

$$g[|J_2(\eta)/J_4(\eta)|] = |J_2(\eta)/J_1(\eta)| \quad (34)$$

Note, g [] indicates a function for converting $|J_2(\eta)/J_4(\eta)|$ to $|J_2(\eta)/J_1(\eta)|$.

The phase modulation index computing unit 31 outputs a nineteenth digital signal 32 corresponding to the computed value expressed by the formula (34).

Next, the angular velocity computing unit 30 executes the computation below based on the components $V_{1,cos}$, $V_{2,cos}$, $V_{1,sin}$ and $V_{2,sin}$ of the sixteenth digital signal 501, and the nineteenth digital signal 32 expressed by the formula (34).

$$|J_2(\eta)/J_1(\eta)| \times [(V_{1, cos}^2 + V_{1, sin}^2)^{\frac{1}{2}}/(V_{2, cos}^2 + V_{2, sin}^2)^{\frac{1}{2}}] = |\tan(\phi s)| \quad (35a)$$

$$|J_2(\eta)/J_1(\eta)| \times [(V_{2, cos}^2 + V_{2, sin}^2)^{\frac{1}{2}}/(V_{1, cos}^2 + V_{1, sin}^2)^{\frac{1}{2}}] = |\cot(\phi s)| \quad (35b)$$

Note, the computed value expressed by the formula (35a) corresponds to the curve 105 shown by a solid line in FIG. 16 and the computed value expressed by the formula (35b) corresponds to the curve 106 shown by a broken line therein.

The angular velocity computing unit 30 responds to the computed values expressed by the formulas (35a),(35b) and the seventeenth digital signal 29 corresponding to each range of the phase difference $\phi s$ according to the logic discrimination of Table (c), computes the phase difference $\phi s$ based on Sagnac effect as shown in Table (d), and outputs a twentieth digital signal 33 corresponding to the computed phase difference (i.e., a signal proportional to the input rotation angular velocity).

As explained above, according to the fourth embodiment, it is possible to obtain not only the same advantages or effects as those obtained by the first embodiment, but also the additional advantage or effect as obtained by the third embodiment (i.e., it is possible to reduce to a minimum a lowering in the linearity and scale factor stability of the gyro occurring due to a fluctuation in the phase modulation index $\eta$ caused by a fluctuation in the maximum phase shift $\Phi m$).

Although the present invention has been disclosed and described by way of several embodiments, it is apparent to those skilled in the art that other embodiments and modifications of the present invention are possible without departing from the spirit or essential features thereof.

We claim:

1. An apparatus for effecting a signal processing for an optical gyro in which light is propagated simultaneously clockwise and counterclockwise through optical propagation path in cooperation with a rotation axis and receives a phase modulation and then a phase difference of the light based on Sagnac effect is detected to obtain a photoelectric output signal proportional to an input rotation angular velocity, the apparatus comprising:

a frequency mixing circuit, responsive to analog and digital reference signals in synchronization in frequency and phase with a drive signal for the phase modulation, for taking signal components of the same frequency fm as, a frequency 2fm twice, and a frequency 4fm four times that of the drive signal from the photoelectric output signal and converting the signal components to a signal of a frequency $\Delta$fm, respectively, to thereby output first, second and third analog signals, respectively, and for converting the analog reference signal to a signal of the frequency $\Delta$fm to thereby output a fourth analog signal;

an analog/digital converter, responsive to a second digital signal in synchronization in phase with the fourth analog signal, for converting the first to third analog signals to a first digital signal;

a digital demodulating means, operatively connected to the frequency mixing circuit and the analog/digital converter, for outputting the second digital signal, generating a third digital signal in synchronization in phase with the fourth analog signal, forming fourth and fifth digital signals in synchronization in phase with the third digital signal and shifted in phase by 90° from each other, effecting a digital multiplication between the first digital signal and the fourth and fifth digital signals to take direct current components from a result of the multiplication, and thus outputting sixth and seventh digital signals;

a quadrant discriminating means, responsive to the sixth and seventh digital signals, for discriminating a quadrant of presence of the phase difference of the light based on Sagnac effect from signs of signal components corresponding to the frequency fm of the photoelectric output signal and the frequency 2fm or 4fm thereof, and outputting eighth and ninth digital signals;

a phase modulation index computing means, responsive to the sixth and seventh digital signals, for outputting a tenth digital signal corresponding to a present phase modulation index from a ratio of each amplitude of the signal components corresponding to the frequencies 2fm and 4fm of the photoelectric output signal; and an angular velocity computing means, responsive to the sixth to tenth digital signals, for outputting an eleventh digital signal proportional to the input rotation angular velocity.

2. An apparatus as set forth in claim 1, wherein the quadrant discriminating means comprises:

means for comparing and discriminating how a mark of quadrant is changed in a predetermined range of quadrant, the mark of quadrant being determined according to a combination of each sign of the signal components corresponding to the frequency fm contained in the sixth and seventh digital signals and the frequency 2fm or 4fm contained therein; and means for executing a logic discrimination of whether the quadrant of presence of the phase difference of the light based on Sagnac effect lies in a range of quadrant which corresponds to an addition of $2\pi[\text{rad}]$ or $-2\pi[\text{rad}]$ to a previous range of presence of the mark of quadrant concerned, to thereby form the eighth and ninth digital signals.

3. An apparatus as set forth in claim 2, wherein the digital demodulating means comprises:

a timing pulse generating means for outputting the second digital signal to the analog/digital converter and generating the third digital signal;

a cosine/sine signal generating means for outputting the fourth and fifth digital signals based on the third digital signal; and first and second digital multiplying means for effecting a multiplication between the first digital signal and the fourth and fifth digital signals, respectively, and taking direct current components from respective results of the multiplication to thereby output the sixth and seventh digital signals.

4. An apparatus as set forth in claim 3, wherein each of the first and second digital multiplying means comprises means for effecting the digital multiplication between the first digital signal and the fourth or fifth digital signal, and means for digitally filtering the multiplied signal to output the sixth or seventh digital signal.

5. An apparatus as set forth in claim 3, wherein the frequency mixing circuit comprises:

a first heterodyne mixer for taking a signal component of the frequency fm from the photoelectric output signal and converting the signal component to a signal of the frequency $\Delta$fm to thereby output the first analog signal;

a second heterodyne mixer for taking a signal component of the frequency 2fm from the photoelectric output signal and converting the signal component to a signal of the frequency $\Delta$fm to thereby output the second analog signal;

a third heterodyne mixer for taking a signal component of the frequency 4fm from the photoelectric output signal and converting the signal component to a signal of the frequency $\Delta$fm to thereby output the third analog signal; and a fourth heterodyne mixer for converting the analog reference signal to a signal of the frequency $\Delta$ fm to thereby output the fourth analog signal.

6. An apparatus as set forth in claim 5, further comprising a reference signal generating circuit for generating a sixth analog signal constituting the drive signal for the phase modulation, and generating a fifth analog signal, a twelfth digital signal, a thirteenth digital signal and a fourteenth digital signal, respectively, in synchronization in frequency and phase with the sixth analog signal, to feed the respective signals to the fourth heterodyne mixer, the first and fourth heterodyne mixers, the second heterodyne mixer, and the third heterodyne mixer, respectively.

7. An apparatus as set forth in claim 1, wherein each of the digital demodulating means, quadrant discriminating means, phase modulation index computing means and angular velocity computing means executes a respective operation based on software processing.

8. An apparatus as set forth in claim 1, wherein the optical propagation path is constituted by an optical fiber.

9. An apparatus as set forth in claim 1, further comprising a digital synthesizing means, responsive to the eleventh digital signal, for outputting a fifteenth digital signal indicating a polarity of the eleventh digital signal, and a sixteenth digital signal indicating the number of pulses corresponding to an angular increment proportional to the input rotation angular velocity.

10. An apparatus as set forth in claim 9, wherein the digital synthesizing means comprises:
   a frequency register for latching a frequency of the eleventh digital signal to thereby output a frequency indication signal, and outputting the fifteenth digital signal;
   a latch circuit, responsive to a clock signal, for latching a seventeenth digital signal corresponding to a present addition data every one cycle of the clock signal and outputting an eighteenth digital signal corresponding to a previous addition data; and
   an adder for effecting an addition of the frequency indication signal to the eighteenth digital signal to thereby output the seventeenth digital signal, and outputting the sixteenth digital signal when it is brought to an overflow state.

11. An apparatus as set forth in claim 9, wherein the quadrant discriminating means comprises:
   means for comparing and discriminating how a mark of quadrant is changed in a predetermined range of quadrant, the mark of quadrant being determined according to a combination of each sign of the signal components corresponding to the frequency fm contained in the sixth and seventh digital signals and the frequency 2fm or 4fm contained therein; and
   means for executing a logic discrimination of whether the quadrant of presence of the phase difference of the light based on Sagnac effect lies in a range of quadrant which corresponds to an addition of $2\pi[rad]$ or $-2\pi[rad]$ to a previous range of presence of the mark of quadrant concerned, to thereby form the eighth and ninth digital signals.

12. An apparatus as set forth in claim 11, wherein the digital demodulating means comprises:
   a timing pulse generating means for outputting the second digital signal to the analog/digital converter and generating the third digital signal;
   a cosine/sine signal generating means for outputting the fourth and fifth digital signals based on the third digital signal; and
   first and second digital multiplying means for effecting a multiplication between the first digital signal and the fourth and fifth digital signals, respectively, and taking direct current components from respective results of the multiplication to thereby output the sixth and seventh digital signals.

13. An apparatus as set forth in claim 12, wherein the frequency mixing circuit comprises:
   a first heterodyne mixer for taking a signal component of the frequency fm from the photoelectric output signal and converting the signal component to a signal of the frequency $\Delta fm$ to thereby output the first analog signal;
   a second heterodyne mixer for taking a signal component of the frequency 2fm from the photoelectric output signal and converting the signal component to a signal of the frequency $\Delta fm$ to thereby output the second analog signal;
   a third heterodyne mixer for taking a signal component of the frequency 4fm from the photoelectric output signal and converting the signal component to a signal of the frequency $\Delta fm$ to thereby output the third analog signal; and
   a fourth heterodyne mixer for converting the analog reference signal to a signal of the frequency $\Delta fm$ to thereby output the fourth analog signal.

14. An apparatus as set forth in claim 13, further comprising a reference signal generating circuit for generating a sixth analog signal constituting the drive signal for the phase modulation, and generating a fifth analog signal, a twelfth digital signal, a thirteenth digital signal and a fourteenth digital signal, respectively, in synchronization in frequency and phase with the sixth analog signal, to feed the respective signals to the fourth heterodyne mixer, the first and fourth heterodyne mixers, the second heterodyne mixer, and the third heterodyne mixer, respectively.

15. An apparatus as set forth in claim 9, wherein each of the digital demodulating means, quadrant discriminating means, phase modulation index computing means and angular velocity computing means executes a respective operation based on software processing.

16. An apparatus as set forth in claim 9, wherein the optical propagation path is constituted by an optical fiber.

17. An apparatus for effecting a signal processing for an optical gyro in which light is propagated simultaneously clockwise and counterclockwise through an optical propagation path in cooperation with a rotation axis and receives a phase modulation and then a phase difference of the light based on Sagnac effect is detected to obtain a photoelectric output signal proportional to an input rotation angular velocity, the apparatus comprising:
   a frequency mixing circuit, responsive to digital reference signals in synchronization with a drive signal for the phase modulation, for taking signal components of the same frequency fm as, a frequency 2fm twice, and a frequency 4fm four times that of the drive signal from the photoelectric output signal and converting the respective signal components to a signal of a frequency $\Delta fm_1$, a signal of a frequency $\Delta fm_2$ and a signal of a frequency $\Delta fm$,, respectively, to thereby output first, second and third analog signals, respectively, and for converting fifth, seventh and ninth analog reference signals in synchronization in phase with the drive signal and having frequencies fm, 2fm and 4fm, respectively, to a signal of the frequency $\Delta fm_1$, a signal of the frequency $\Delta fm_2$ and a signal of the frequency $\Delta fm_3$, respectively, to thereby output fourth, sixth and eighth analog signals, respectively;
   an analog/digital converting circuit, responsive to second, seventh and twelfth digital signals in synchronization with the fourth, sixth and eighth analog signals, respectively, for converting the first, second and third analog signals to first, sixth and eleventh digital signals, respectively;

a digital demodulating means, operatively connected to the frequency mixing circuit and the analog/digital converting circuit, for outputting the second, seventh and twelfth digital signals, generating third, eighth and thirteenth digital signals in synchronization with the fourth, sixth and eighth analog signals, respectively, forming fourth and fifth digital signals in synchronization with the third digital signal and shifted in phase by 90° from each other, ninth and tenth digital signals in synchronization with the eighth digital signal and shifted in phase by 90° from each other, and fourteenth and fifteenth digital signals in synchronization with the thirteenth digital signal and shifted in phase by 90° from each other, effecting digital multiplications between the first digital signal and the fourth and fifth digital signals, between the sixth digital signal and the ninth and tenth digital signals, and between the eleventh digital signal and the fourteenth and fifteenth digital signals, and taking direct current components from results of the respective multiplication to thus output a sixteenth digital signal;

a polarity discriminating means, responsive to the sixteenth digital signal, for discriminating a polarity of the input rotation angular velocity to thereby output a seventeenth digital signal;

a phase modulation index computing means, responsive to the sixteenth digital signal, for outputting an eighteenth digital signal for keeping constant a ratio of each amplitude of the signal components corresponding to the frequencies 2fm and 4fm of the photoelectric output signal, and outputting a ninteenth digital signal corresponding to a present phase modulation index; and an angular velocity computing means, responsive to the sixteenth, seventeenth and ninteenth digital signals, for outputting a twentieth digital signal proportional to the input rotation angular velocity.

18. An apparatus as set forth in claim 17, wherein the polarity discriminating means comprises:

means for executing a logic discrimination of the phase difference of the light proportional to the input rotation angular velocity, based on each sign of the signal components corresponding to the frequency fm contained in the sixteenth digital signal and the frequency 2fm or 4fm contained therein, with respect to each range of $-\pi \sim -\pi/2$, $-\pi/2 \sim 0$, $0 \sim \pi/2$, and $\pi/2 \sim \pi$ [rad]; and means for discriminating the polarity of the input rotation angular velocity based on a result of the logic discrimination to thereby form the seventeenth digital signal.

19. An apparatus as set forth in claim 18 wherein the angular velocity computing means comprises:

means for computing the phase difference of the light proportional to the input rotation angular velocity, based on the seventeenth and ninteenth digital signals and the signal components corresponding to the frequencies fm and 2fm contained in the sixteenth digital signal, with respect to each range of $-\pi \sim -3\pi/4$, $-3\pi/4 \sim -\pi/2$, $-\pi/2 \sim -\pi/4$, $-\pi/4 \sim 0$, $0 \sim \pi/4$, $\pi/4 \sim \pi/2$, $\pi/2 \sim 3\pi/4$, and $3\pi/4 \sim \pi$ [rad], or each range of $-\pi \sim -\pi/2$, $-\pi/2 \sim 0$, $0 \sim \pi/2$, and $\pi/2 \sim \pi$ [rad]; and means for outputting the twentieth digital signal proportional to the input rotation angular velocity based on a result of the computing.

20. An apparatus as set forth in claim 19, wherein the digital demodulating means comprises:

a first timing pulse generating means for outputting the second digital signal to the analog/digital converting circuit and generating the third digital signal;

a second timing pulse generating means for outputting the seventh digital signal to the analog/digital converting circuit and generating the eighth digital signal;

a third timing pulse generating means for outputting the twelfth digital signal to the analog/digital converting circuit and generating the thirteenth digital signal;

a first cosine/sine signal generating means for outputting the fourth and fifth digital signals in response to the third digital signal;

a second cosine/sine signal generating means for outputting the ninth and tenth digital signals in response to the eighth digital signal;

a third cosine/sine signal generating means for outputting the fourteenth and fifteenth digital signals in response to the thirteenth digital signal; and a digital multiplying means for effecting multiplications between the first digital signal and the fourth and fifth digital signals, between the sixth digital signal and the ninth and tenth digital signals, and between the eleventh digital signal and the fourteenth and fifteenth digital signals, respectively, and taking direct current components from results of the respective multiplication to thus output the sixteenth digital signal.

21. An apparatus as set forth in claim 20, wherein the frequency mixing circuit comprises:

a first heterodyne mixer, responsive to a twenty-first digital reference signal having a repetition frequency of $(fm+\Delta fm_1)$, for taking a signal component of the frequency fm from the photoelectric output signal and converting the signal component to a signal of the frequency $\Delta fm_1$ to thereby output the first analog signal;

a second heterodyne mixer, responsive to a twenty-second digital reference signal having a repetition frequency of $(2fm+\Delta fm,)$, for taking a signal component of the frequency 2fm from the photoelectric output signal and converting the signal component to a signal of the frequency $\Delta fm_2$ to thereby output the second analog signal;

a third heterodyne mixer, responsive to a twenty-third digital reference signal having a repetition frequency of $(4fm+\Delta fm_3)$, for taking a signal component of the frequency 4fm from the component to a signal of the frequency $\Delta fm_3$ to thereby output the third analog signal;

a fourth heterodyne mixer, responsive to the twenty-first digital reference signal, for converting the fifth analog reference signal to a signal of the frequency $\Delta fm_1$ to thereby output the fourth analog signal;

a fifth heterodyne mixer, responsive to the twenty-second digital reference signal, for converting the seventh analog reference signal to a signal of the frequency $\Delta fm_2$ to thereby output the sixth analog signal; and a sixth heterodyne mixer, responsive to the twenty-third digital reference signal, for converting the ninth analog reference signal to a signal of the frequency $\Delta fm_2$ to thereby output the eighth analog signal.

22. An apparatus as set forth in claim 21, further comprising a reference signal generating circuit for outputting a tenth analog signal constituting the drive signal for the phase modulation, and generating the fifth, seventh and ninth analog reference signals in synchronization in phase with the tenth analog signal and having the frequencies fm, 2fm and 4fm, respectively, and the twenty-first, twenty-second and twenty-third digital reference signals (11A,12A,13A) having the repetition frequencies (fm +$\Delta$fm$_1$), (2fm+$\Delta$ fm$_2$) and (4fm+$\Delta$fm$_3$), respectively.

23. An apparatus as set forth in claim 17, wherein the digital demodulating means, polarity discriminating means, phase modulation index computing means and angular velocity computing means are constituted in the form of a digital signal processor and execute respective operations based on software processing.

24. An apparatus as set forth in claim 17, wherein the optical propagation path is constituted by an optical fiber.

* * * * *

UNITED STATES PATENT AND TRADEMARK OFFICE
CERTIFICATE OF CORRECTION

PATENT NO. : 5,289,257

DATED : February 22, 1994

INVENTOR(S) : Kurokawa et al.

It is certified that error appears in the above-identified patent and that said Letters Patent is hereby corrected as shown below:

Col. 4, line 2 "$fm_1$" should read --$\Delta fm_1$--

Col. 10, line 17 "$-3\pi/2 \sim \pi$" should read -- $-3\pi/2 \sim -\pi$ --

Col. 11, line 29 "$M°$" should read --$M_o$--

Col. 11, line 29 "$N°$" should read --$N_o$--

Col. 11, line 53 "$N°$" should read --$N_o$--

Col. 12, line 34 "$g[(V^2_2, \cos+V^2_2, \sin)½/(V^2_3, \cos+V^2_3, \sin)½]$" should read --$g[(V_2, \cos^2+V_2, \sin^2)½/(V_3, \cos^2+V_3, \sin^2)½]$--

Col. 12, line 53 "$[(V^2_1, \cos+V^2_1, \sin)½/(V^2_2, \cos+V^2_2, \sin)½]$" should read --$[(V_1, \cos^2+V_1, \sin^2)½/(V_2, \cos^2+V_2, \sin^2)½]$--

Col. 14, line 48 "11" should read --211--

Col. 15, line 8 " $\psi$ " should read -- $\eta$ --

Col. 18, line 48 " $(V^2_1, \cos+V^2_1, \sin)½/(V^2_2, \cos+V^2_2, \sin)½]$ " should read --$[(V_1, \cos^2+V_1, \sin^2)½/(V_2, \cos^2+V_2, \sin^2)½]$--

Col. 18, line 52 " $(V^2_2, \cos+V^2_2, \sin)½/(V^2_1, \cos+V^2_1, \sin)½]$ " should read --$[(V_2, \cos^2+V_2, \sin^2)½/(V_1, \cos^2+V_1, \sin^2)½]$--

UNITED STATES PATENT AND TRADEMARK OFFICE
CERTIFICATE OF CORRECTION

PATENT NO. : 5,289,257

DATED : February 22, 1994

INVENTOR(S) : Kurokawa et al.

It is certified that error appears in the above-identified patent and that said Letters Patent is hereby corrected as shown below:

Col. 21, line 11 "$\psi_1$" should read --$\psi_1$)--

Col. 21, line 13 "$\Delta\psi m_1$" should read --$\Delta\omega_{m1}$--

Col. 21, line 41 insert --$v_1 \propto 2P_s \cos\phi_s \cdot J_1(\eta) \cdot \sin(\Delta\omega_{m1} t + \phi_s)$ (23)-- after the line ending with the word "17A>;"

Col. 22, line 16 insert --$v_{ssr1} \propto \sin(\Delta\omega_{m1} t + \phi_{ssr1})$ (24c)-- after the line ending with the word "17B>;"

Col. 23, line 52 second occurrence of "=" should read -- — --

Col. 23, line 53 second occurrence of "=" should read -- — --

Col. 23, line 54 second occurrence of "=" should read -- — --

Col. 24, line 19 "$(V^2{}_2,\cos+V^2{}_2,\sin)½/(V^2{}_3,\cos+V^2{}_3,\sin)½$" should read --$V_2,\cos^2+V_2,\sin^2)½/(V_3,\cos^2+V_3,\sin^2)½=$ --

Col. 24, line 28 "g☐" should read --g[ ]--

Col. 24, line 40 "$[(V^2{}_1,\cos+V^2{}_1,\sin)½/(V_2,\cos^2+V^2{}_2,\sin)½]$" should read --$[(V_1,\cos^2+V_1,\sin^2)½/(V_2,\cos^2+V_2,\sin^2)½]$--

Col. 24, line 43 "$[(V^2{}_2,\cos+V^2{}_2,\sin)½/(V_1,\cos^2+V^2{}_1,\sin)½]$" should read --$[(V_2,\cos^2+V_2,\sin^2)½/(V_1,\cos^2+V_1,\sin^2)½]=$--

UNITED STATES PATENT AND TRADEMARK OFFICE
CERTIFICATE OF CORRECTION

PATENT NO. : 5,289,257

DATED : February 22, 1994

INVENTOR(S) : Kurokawa et al.

It is certified that error appears in the above-identified patent and that said Letters Patent is hereby corrected as shown below:

Col. 30, line 44 "$(2fm + \Delta fm,)$" should read --$(2fm + \Delta fm_2)$--

Col. 30, line 52 insert --photoelectric output signal and converting the signal-- before the word "component"

Col. 30, line 62 "$\Delta fm_2$" should read --$\Delta fm_3$--

Signed and Sealed this

Twenty-first Day of January, 1997

Attest:

BRUCE LEHMAN

Attesting Officer

Commissioner of Patents and Trademarks